United States Patent
Fujinawa

(10) Patent No.: US 6,950,139 B2
(45) Date of Patent: Sep. 27, 2005

(54) IMAGE READING DEVICE AND STORAGE MEDIUM STORING CONTROL PROCEDURE FOR IMAGE READING DEVICE

(75) Inventor: Nobuhiro Fujinawa, Yokohama (JP)

(73) Assignee: Nikon Corporation, Tokyo (JP)

(*) Notice: Subject to any disclaimer, the term of this patent is extended or adjusted under 35 U.S.C. 154(b) by 705 days.

(21) Appl. No.: 09/757,470

(22) Filed: Jan. 11, 2001

(65) Prior Publication Data

US 2002/0135692 A1 Sep. 26, 2002

Related U.S. Application Data

(63) Continuation-in-part of application No. 09/487,807, filed on Jan. 20, 2000, now abandoned.

(30) Foreign Application Priority Data

Jan. 22, 1999 (JP) .......................................... 11-014322
Jan. 21, 2000 (JP) ....................................... 2000-013292

(51) Int. Cl.⁷ .............................................. H04N 5/33
(52) U.S. Cl. ..................................................... 348/335
(58) Field of Search ................................ 348/164, 336, 348/335, 345, 144, 166, 175, 147, 208.12, 208.1, 33, 34, 96, 216.1, 217.1, 227.1, 230.1, 270, 271, 272, 273; 382/275, 274, 167, 284, 162

(56) References Cited

U.S. PATENT DOCUMENTS

| | | | | |
|---|---|---|---|---|
| 5,396,282 A | * | 3/1995 | Ogikubo | 348/144 |
| 5,404,013 A | * | 4/1995 | Tajima | 250/332 |
| 5,488,674 A | * | 1/1996 | Burt et al. | 382/284 |
| 2003/0128889 A1 | * | 7/2003 | Maeda et al. | 382/275 |

* cited by examiner

Primary Examiner—Chris Kelley
Assistant Examiner—Behrooz Senfi
(74) Attorney, Agent, or Firm—Oliff & Berridge PLC

(57) ABSTRACT

In addition to an autofocusing operation performed under visible light, an autofocusing operation is also performed under infrared light. By using infrared light, changes in the contrast can be detected accurately regardless of the character of the image. As a result, the focused position can be detected with a high degree of accuracy even in a dark image or an image in which the character of the image changes drastically. In addition, by ascertaining the difference between the infrared light focused position and the visible light focused position and correcting with the infrared light focused position, a focused matched position can be detected with an even higher degree of accuracy.

31 Claims, 31 Drawing Sheets

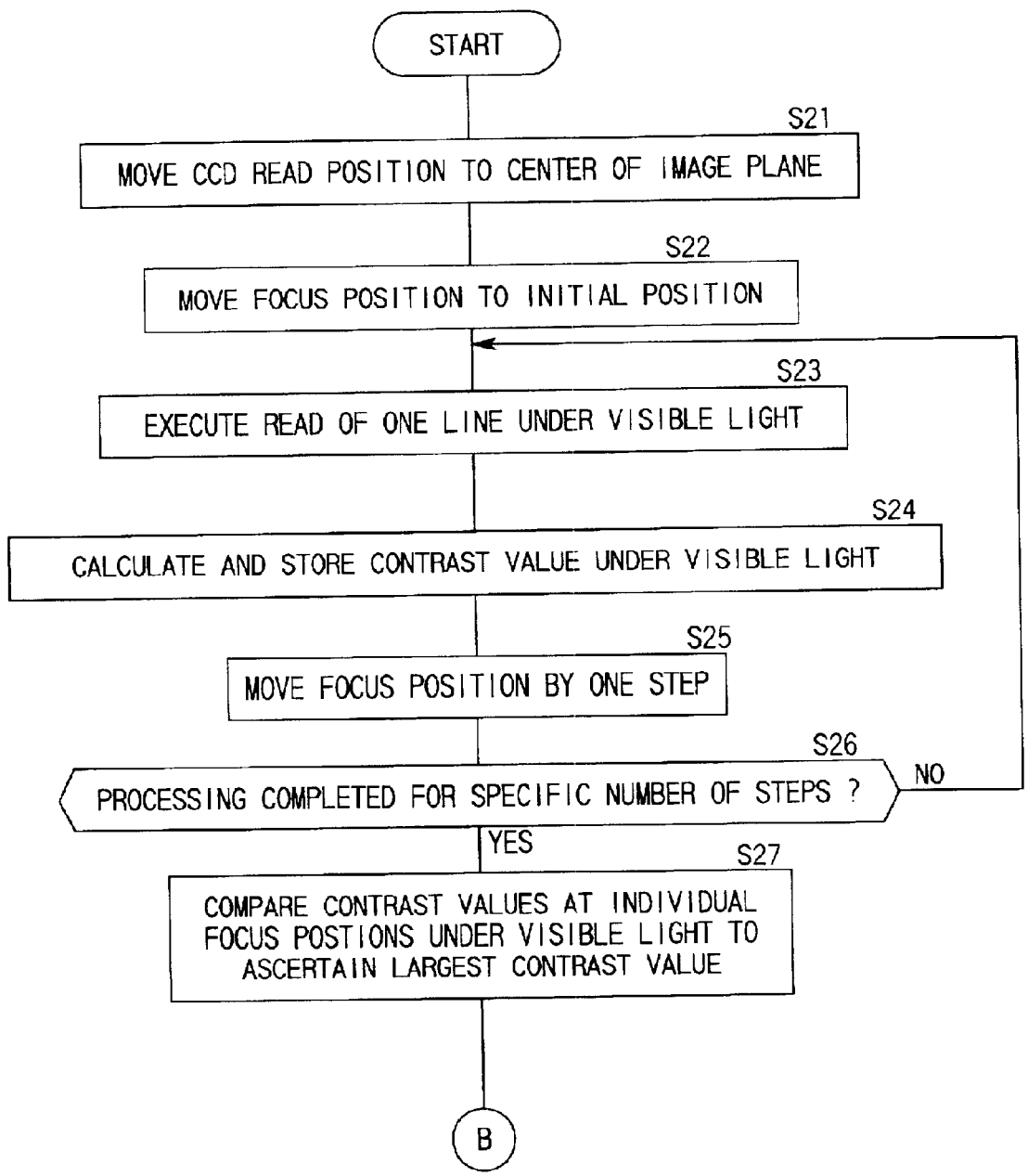

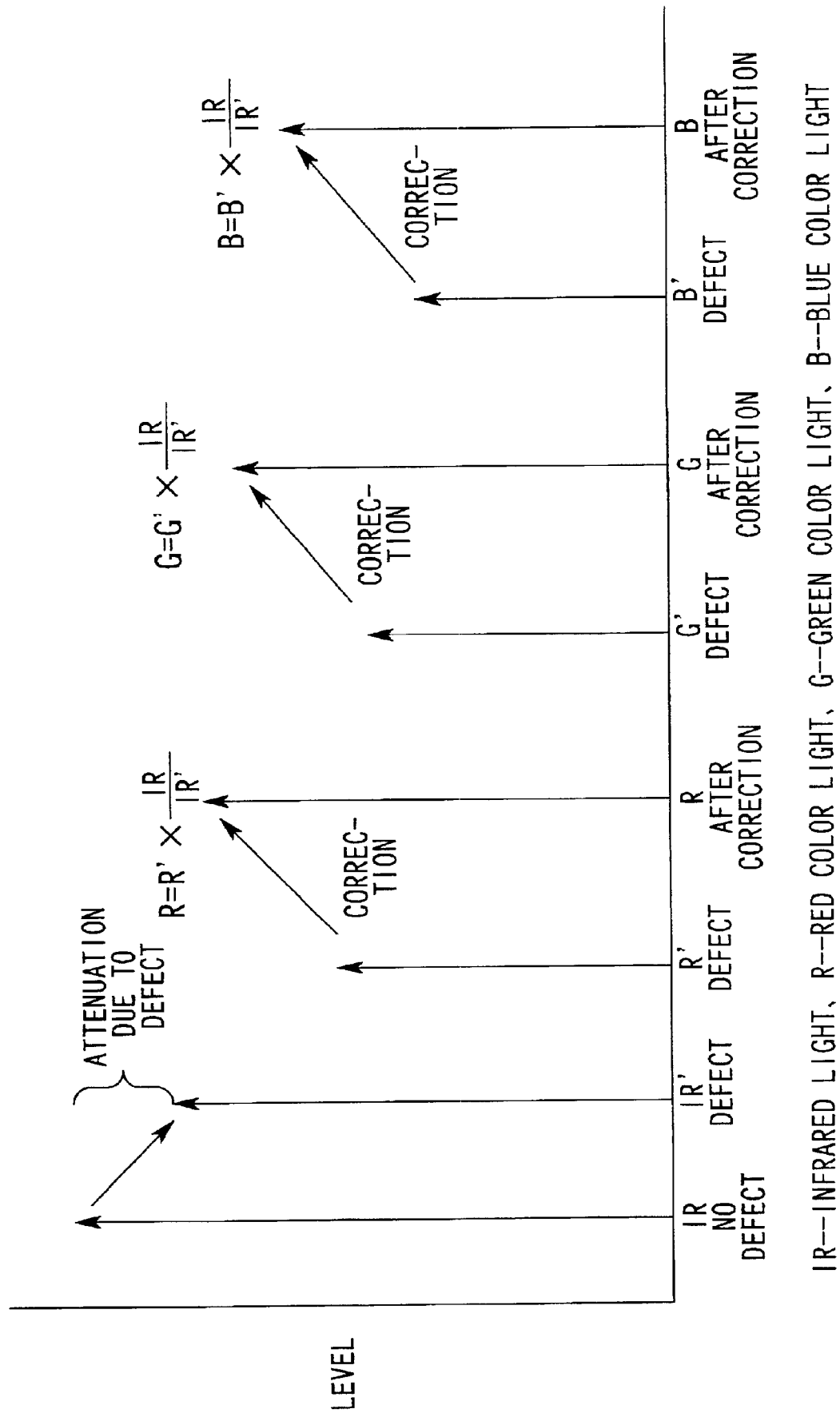

(i) BEFORE CORRECTION   (ii) INFRARED LIGHT OUTPUT   (iii) AFTER CORRECTION (i)   (ii)   (iii)

FIG. 25A

IR LEVEL (DEFECT PRESENT)

| 255 | 255 | 120 |
|-----|-----|-----|
| 120 | 50  | 120 |
| 255 | 255 | 255 |

FIG. 25B

VISIBLE LEVEL (DEFECT PRESENT)

| 200 | 200 | 200 | 200 | 200 | 200 |
|-----|-----|-----|-----|-----|-----|
| 200 | 200 | 200 | 200 | 200 | 200 |
| 200 | 200 | 200 | 94  | 200 | 200 |
| 200 | 94  | 20  | 47  | 100 | 100 |
| 200 | 200 | 100 | 100 | 100 | 100 |
| 200 | 200 | 100 | 100 | 200 | 200 |

FIG. 25C

VISIBLE LEVEL (NO DEFECT)

| 200 | 200 | 200 | 200 | 200 | 200 |
|-----|-----|-----|-----|-----|-----|
| 200 | 200 | 200 | 200 | 200 | 200 |
| 200 | 200 | 200 | 200 | 200 | 200 |
| 200 | 200 | 100 | 100 | 100 | 100 |
| 200 | 200 | 100 | 100 | 100 | 100 |
| 200 | 200 | 100 | 100 | 200 | 200 |

FIG. 26A1

| 200 | 200 | 200 | 200 | 200 | 200 | ABSOLUTE VALUE TOTAL |
|---|---|---|---|---|---|---|
| -55 | -55 | 80 | 200 | 200 | 200 | 190 |
| 80 | 150 | 80 | 94 | 200 | 200 | 310 |
| -55 | -161 | -235 | 47 | 100 | 100 | 451 |
| 200 | 200 | 100 | 100 | 100 | 100 | TOTAL 951 |
| 200 | 200 | 100 | 100 | 200 | 200 | |

FIG. 26A2

| 200 | 200 | 200 | 200 | 200 | 200 | ABSOLUTE VALUE TOTAL |
|---|---|---|---|---|---|---|
| 200 | -55 | -55 | 80 | 200 | 200 | 190 |
| 200 | 80 | 150 | -26 | 200 | 200 | 256 |
| 200 | -161 | -235 | -208 | 100 | 100 | 604 |
| 200 | 200 | 100 | 100 | 100 | 100 | TOTAL 1050 |
| 200 | 200 | 100 | 100 | 200 | 200 | |

FIG. 26A3

| 200 | 200 | 200 | 200 | 200 | 200 | ABSOLUTE VALUE TOTAL |
|---|---|---|---|---|---|---|
| 200 | 200 | -55 | -55 | 80 | 200 | 190 |
| 200 | 200 | 80 | 44 | 80 | 200 | 204 |
| 200 | 94 | -235 | -208 | -55 | 100 | 598 |
| 200 | 200 | 100 | 100 | 100 | 100 | TOTAL 992 |
| 200 | 200 | 100 | 100 | 200 | 200 | |

FIG. 27B1

| 200 | 200 | 200 | 200 | 200 | 200 |
|---|---|---|---|---|---|
| 200 | 200 | 200 | 200 | 200 | 200 |
| -55 | -55 | 80 | 200 | 200 | 200 |
| 80 | 44 | -100 | 47 | 100 | 100 |
| -55 | -55 | -155 | 100 | 100 | 100 |
| 200 | 200 | 100 | 100 | 200 | 200 |

ABSOLUTE VALUE TOTAL

190

224

265

TOTAL 679

FIG. 27B2

| 200 | 200 | 200 | 200 | 200 | 200 |
|---|---|---|---|---|---|
| 200 | 200 | 200 | 200 | 200 | 200 |
| 200 | -55 | -55 | -26 | 200 | 200 |
| 200 | -26 | -30 | -73 | 100 | 100 |
| 200 | -55 | -155 | -155 | 100 | 100 |
| 200 | 200 | 100 | 100 | 200 | 200 |

ABSOLUTE VALUE TOTAL

136

129

365

TOTAL 630

FIG. 27B3

| 200 | 200 | 200 | 200 | 200 | 200 |
|---|---|---|---|---|---|
| 200 | 200 | 200 | 200 | 200 | 200 |
| 200 | 200 | -55 | -161 | 80 | 200 |
| 200 | 94 | -100 | 3 | -20 | 100 |
| 200 | 200 | -155 | -155 | -155 | 100 |
| 200 | 200 | 100 | 100 | 200 | 200 |

ABSOLUTE VALUE TOTAL

296

123

465

TOTAL 884

FIG. 28C1

| 200 | 200 | 200 | 200 | 200 | 200 |
|---|---|---|---|---|---|
| 200 | 200 | 200 | 200 | 200 | 200 |
| 200 | 200 | 200 | 94 | 200 | 200 |
| -55 | -161 | -100 | 47 | 100 | 100 |
| 80 | 150 | -20 | 100 | 100 | 100 |
| -55 | -55 | -155 | 100 | 200 | 200 |

ABSOLUTE VALUE TOTAL

316

250

265

TOTAL 831

FIG. 28C2

| 200 | 200 | 200 | 200 | 200 | 200 |
|---|---|---|---|---|---|
| 200 | 200 | 200 | 200 | 200 | 200 |
| 200 | 200 | 200 | 94 | 200 | 200 |
| 200 | -161 | -235 | 73 | 100 | 100 |
| 200 | 80 | 50 | -20 | 100 | 100 |
| 200 | -55 | -155 | -155 | 200 | 200 |

ABSOLUTE VALUE TOTAL

469

150

365

TOTAL 984

FIG. 28C3

| 200 | 200 | 200 | 200 | 200 | 200 |
|---|---|---|---|---|---|
| 200 | 200 | 200 | 200 | 200 | 200 |
| 200 | 200 | 200 | 94 | 200 | 200 |
| 200 | 94 | -235 | -208 | -20 | 100 |
| 200 | 200 | -20 | 50 | -20 | 100 |
| 200 | 200 | -155 | -155 | -55 | 200 |

ABSOLUTE VALUE TOTAL

463

90

365

TOTAL 918

IMAGE READING DEVICE AND STORAGE MEDIUM STORING CONTROL PROCEDURE FOR IMAGE READING DEVICE

This application is a continuation in part of U.S. patent application Ser. No. 09/487,807 filed Jan. 20, 2000 now abandoned.

INCORPORATION BY REFERENCE

The disclosure of the following priority applications are herein incorporated by reference:

Japanese Patent Application No. 11-14322, filed Jan. 22, 1999,

Japanese Patent Application No. 2000-13292, filed Jan. 21, 2000

BACKGROUND OF THE INVENTION

1. Field of the Invention

The present invention relates to an image reading device that optically reads an image on an original such as photographic film by irradiating light onto the original and a storage medium that stores a control procedure implemented on the image reading device. More specifically, the present invention relates to an image reading device provided with an autofocus mechanism that uses an infrared light to achieve an accurate read of the image on the original and a storage medium that stores a control procedure to be implemented on the image reading device.

2. Related Art

Image reading devices known in the art include film scanners that read film images obtained through a photographing operation performed by a camera. A film scanner reads an image on negative film or reversal film and transmits image data obtained to a host computer such as a personal computer or to an image processing device having an image display function.

In an image reading device, the positional relationship between the surface of the original and the reading optical system that reads the original changes in correspondence to the characteristics of the original. The characteristics of the original include, for instance, the thickness of the original and the warpage (curling) of the film original. The change in the relative positions described above causes a focal displacement at the reading optical system. Namely, due to the focal displacement occurring at the reading optical system, the image reading device cannot form an accurate image at the light-receiving surface of the image-capturing element such as a CCD line sensor which reads the original image. As a result, the image reading device cannot output high quality image data.

For this reason, in order to obtain high quality image data, the image reading device must be provided with an autofocus mechanism that adjusts the position of the reading optical system relative to the original to an optimal position.

In the prior art, autofocus in an image reading device is implemented as follows.

Autofocusing is normally implemented near the center of the original. Thus, the image reading device moves the reading optical system to position it near the center of the original. The reading optical system is moved by a scanning mechanism which moves the optical system along the sub-scanning direction.

The image reading device performs positioning to achieve a positional relationship between the original and the optical system so that they are at predetermined initial positions (e.g., positions at which the distance between the optical system and the original is at a maximum). This positioning to the initial positions is implemented by a focusing mechanism.

Next, the image reading device starts up an illuminating device to emit light in R (red), G (green) or B (blue). In response, the image-capturing element reads an image corresponding to one line (along the main scanning direction). It is to be noted that the design specifications of the reading optical system determine the optimal color light among R (red), G (green) and B (blue).

The image reading device then engages in main scanning to read an image corresponding to one line (along the main scanning direction). In other words, the image-capturing element at the image reading device receives the light having been transmitted through the original at a plurality of pixels and outputs a plurality of sets of image data, each indicating the intensity of the light received at one of the plurality of pixels. In this connection, the image-capturing element at the image reading device converts the light that has been received to image data and outputs the image data in units of a plurality of pixels corresponding to one line.

When the image data corresponding to the one line have been output, the image reading device detects a contrast value based upon the image data and stores the value. The contrast value is obtained by ascertaining absolute values, each representing the difference between the sets of image data corresponding to two adjacent pixels and then adding up the absolute values representing the differences.

Next, the focusing mechanism at the image reading device changes the positional relationship between the original and the reading optical system by a specific distance (hereafter referred to as the distance corresponding to one step). For instance, the focusing mechanism may change the positional relationship between the original and the reading optical system by reducing the distance therebetween by the distance corresponding to one step. The image reading device again engages in the operation for obtaining the contrast value explained above after the positional relationship between the original and the reading optical system has been changed.

The image reading device repeats the operations to change the distance between the original and the reading optical system by a distance corresponding to one step in their positional relationship and to obtain the contrast value under the current positional relationship until the original and the reading optical system reach a predetermined positional relationship.

Subsequently, the image reading device compares the contrast values obtained in correspondence to the individual positional relationships and determines the position at which the contrast value is the largest to set it as the focused position.

FIG. 30 shows an example of image data for one line obtained at a defocused position (non-focused position) by employing a CCD line sensor as the image-capturing element. In FIG. 30, the horizontal axis represents the pixel columns at the CCD line sensor and the vertical axis represents the output value of the image data output by the CCD line sensor. In this example, points corresponding to approximately 500 pixels are represented along the horizontal axis.

FIG. 31 presents image data for one line obtained at the focused position by employing a CCD line sensor as the image-capturing element. The relationship between the vertical axis and the optical axis in FIG. 31 is the same as that in FIG. 30.

As shown in FIG. 30, the output values from adjacent pixels at the CCD line sensor differ from each other only to a small degree at the defocused position. Thus, the contrast value at the defocused position is small.

As shown in FIG. 31, the output values from adjacent pixels at the CCD line sensor fluctuate greatly at the focused position. As a result, the contrast value at the focused position is large.

FIG. 32 presents an example of the change in the distance in increments of one step as mentioned earlier (the horizontal axis) and the change in the contrast value (the vertical axis). The values along the horizontal axis represent the number of pulses supplied to the stepping motor (part of the focusing mechanism) which drives the optical system in the focusing direction. In this example, the stepping motor moves the optical system to the measuring position which is one step ahead in response to a supply of four pulses. In addition, FIG. 32 illustrates changes in the contrast value occurring under visible light (any of R, G and B) as do FIGS. 30 and 31.

The image reading device compares the contrast values shown in FIG. 32 and determines the position (along the horizontal axis) with the largest contrast value as the focused position. After fixing the focused position at the focus position with the largest contrast value as described above, the image reading device repeats reading one line along the main scanning direction with the CCD line sensor and moving the reading optical system along the sub-scanning direction with the scanning mechanism. Through this process, the image reading device reads the image on the original by scanning the entire surface of the original.

Autofocusing implemented in the image reading device in the prior art described above poses the following problems.

First, in the image reading device in the prior art, a plurality of contrast values are obtained by changing the positional relationship between the original and the reading optical system by one step at a time. In such a case, if the plurality of contrast values thus obtained vary only to a small degree among themselves, it is difficult to detect the focused position.

For instance, if the image on the original shows a night scene or a starry sky, the individual sets of image data corresponding to the individual lines output by the image-capturing element will indicate small values on the whole. As a result, the relative difference among the contrast values each obtained by the image reading device by reading image data for one line under a specific positional relationship between the original and the reading optical system achieved by changing the positional relationship by one step is small. Thus, it is difficult to determine the focused position.

FIG. 33 illustrates a specific instance of the problem discussed above. FIG. 33 presents an example of a film original upon which a comet in a night sky has been photographed. In FIG. 33, the white line extending diagonally represents the comet. The image reading device sets a position around the center of the film original in FIG. 33 as the autofocus position.

FIG. 34 presents image data for one line obtained at a defocused position (non-focused position) by reading the image shown in FIG. 33 with a CCD line sensor constituting the image-capturing element. The relationship between the vertical axis and the horizontal axis in FIG. 34 is the same as that in FIG. 30. As illustrated in FIG. 34, the image data for one line at the defocused position indicate a high level of brightness over the image area corresponding to the comet and indicate a low level of brightness in other areas.

FIG. 35 presents image data for one line obtained at the focused position by reading the image shown in FIG. 33 with a CCD line sensor constituting the image-capturing element. The relationship between the vertical axis and the horizontal axis in FIG. 35 is the same as that in FIG. 34. As illustrated in FIG. 35, the image data for one line at the focused position indicate a high level of brightness over the image area corresponding to the comet and indicate a low level of brightness in the other areas. Consequently, the difference between the contrast value at the focused position and contrast value at the defocused position (non-focused position) is extremely small in the case of an image such as that shown in FIG. 33.

FIG. 36 illustrates the relationship between the change in the distance made in units of single steps (the horizontal axis) and the change in the contrast value (the vertical axis) with regard to the image shown in FIG. 33. The relationship between the vertical axis and the horizontal axis in FIG. 36 is the same as that in FIG. 32.

The image reading device compares the contrast values and determines the position (along the horizontal axis) with the largest contrast value as the focused position. However, the image reading device may make an erroneous decision with respect to the contrast value peak position if the contrast values vary only to a small degree as shown in FIG. 21. This results in a problem in that the image reading device may make an error in determining the focused position.

Secondly, in autofocusing achieved in the image reading device in the prior art, it is difficult to detect the focused position located in an area where the composition of the image on the original changes drastically.

Namely, a slight mechanical displacement may cause the focusing mechanism, which moves the optical system by one step, to set the optical system at a position which is offset along the sub-scanning direction, resulting in the optical system aligning with the original at the offset position. In this case, since the composition of the image drastically changes from, for instance, bright to dark, the contrast changes radically. For this reason, the correct contrast peak position cannot be detected and, instead, an erroneous contrast peak position is detected. This leads to a problem in that the image reading device in the prior art detects an erroneous focused position.

SUMMARY OF THE INVENTION

An object of the present invention is to provide an image reading device capable of implementing accurate autofocusing.

Another object of the present invention is to provide an image reading device capable of outputting a high quality image.

Yet another object of the present invention is to provide a storage medium that stores a control procedure to be implemented on the image reading device.

In order to achieve the objects described above, the image reading device according to the present invention comprises an infrared component separator that separates the color components of an image light flux passing through a transmissive original into an infrared component; an infrared image-capturing device that outputs an infrared image signal by capturing the infrared component of the image light flux that has been separated by the infrared component separator; a visible component separator that separates the color components of the image light flux passing through the transmissive original into a visible component; a visible image-capturing device that outputs a visible image signal by capturing the visible component of the image light flux that has been separated by the visible component separation device; an image forming optical system that forms the image of the light flux passing through the transmissive original at the infrared image-capturing device or the visible image-capturing device; a focal adjustment device that adjusts the position of the image forming optical system relative to the transmissive original; a means for image forming position decision-making that determines the position of the image forming optical system relative to the transmissive original as a visible image forming position at which the visible component of the image light flux is formed at the visible image-capturing device based upon the infrared image signal; and a control device that implements control on the focal adjustment device based upon the decision made by the means for image forming position decision-making.

This image reading device may further comprise an infrared component detector that detects a level of the infrared component obtained through separation by the infrared component separator and a correction device that detects a defect signal attributable to dirt, dust, a scratch or the like on the transmissive original based upon the infrared component level detected by the infrared component detector and corrects the visible image signal by using the defects signal thus detected.

In this case, the correction device comprises a defective infrared component detector that detects a defective infrared component level at a defective position in the transmissive original manifesting an infrared component level lower than a first infrared component level; a correction coefficient calculator that obtains a correction coefficient by calculating (first infrared component level)/(defective infrared component level) based upon the first infrared component level and the defective infrared component level; a visible light component detector that detects a visible component level of the visible component obtained through separation by the visible component separator; and a multiplier that calculates the corrected visible component level by multiplying the defective visible component level at the defective position in the transmissive original by the correction coefficient.

In this image reading device, the infrared image-capturing device may receive the infrared component of light passing through the transmissive original at a plurality of pixels and output a plurality of infrared image signals each indicating an intensity level of the component of light received at the associated pixel. In this case, the means for image forming position decision-making may receive the plurality of infrared image signals output by the infrared image-capturing device at a plurality of measuring positions corresponding to various distances between the transmissive original and the image forming optical system to determine the visible image forming position in correspondence to the position of the image forming optical system relative to the transmissive original with the highest contrast value among contrast values of the plurality of infrared image signals.

The image forming position decision-making may select either the visible image signal or the infrared image signal to determine the visible image forming position based upon the selected image signal, or it may determine the visible image forming position based upon the infrared image signal if it fails to determine the visible image forming position based upon the visible image signal.

Alternatively, the means for image forming position decision-making may receive both the visible image signal and the infrared image signal in advance to determine the visible image forming position based upon the infrared image signal after it fails to determine the visible image forming position based upon the visible image signal. As a further alternative, the means for image forming position decision-making may receive an infrared image signal output by the infrared image-capturing device after it fails to determine the visible image forming position based upon the visible image signal, to determine the visible image forming position based upon the infrared image signal.

In an image reading device in which the means for image forming position decision-making determines the visible image forming position based upon an infrared image signal after it fails to determine the visible image forming position based upon a visible image signal, the image-capturing device and the means for image forming position decision-making may be structured as follows. The visible image-capturing device receives the visible component at a plurality of pixels and outputs a plurality of visible image signals each indicating the level of the intensity of the light received at one of the plurality of pixels. The means for image forming position decision-making receives the plurality of visible image signals output by the visible image-capturing device at a plurality of measuring positions corresponding to the various distances between the transmissive original and the image forming optical system, detects the largest contrast value representing the maximum value among the contrast values of the plurality of visible image signals and decides that it has failed to determine the visible image forming position if the largest contrast value is smaller than a threshold value.

In the image reading device in which the means for image forming position decision-making determines the visible image forming position based upon an infrared image signal after it fails to determine the visible image forming position based upon a visible image signal, the visible image-capturing device and the means for image forming position decision-making may be also structured as follows. The visible image-capturing device receives the visible component at a plurality of pixels and outputs a plurality of visible image signals each indicating an intensity level of the component received at the associated pixel. The means for image forming position decision-making receives the plurality of visible image signals output by the visible image-capturing device at a plurality of measuring positions corresponding to various distances set between the transmissive original and the image forming optical system, detects the largest contrast value representing the maximum value among the contrast values of the plurality of visible image signals, calculates a corrected largest contrast value by correcting the largest contrast value and decides that it has failed to determine the visible image forming position if at least one of the contrast values obtained at measuring positions outside a specific range which includes the measuring position corresponding to the largest contrast value exceeds the corrected contrast value.

The means for image forming position decision-making may include a storage device that stores a quantity of displacement manifesting between an infrared image forming position at which an infrared image is formed by the image forming optical system and a position at which a visible image is formed by the image forming optical system along the direction of the optical axis of the image forming optical system to enable it to determine an infrared image forming position at which an image of the infrared component is formed at the infrared image-capturing device based upon the infrared image signal and to determine the visible image forming position based upon the quantity of displacement and the infrared image forming position.

The storage medium that stores a control procedure to be implemented in an image reading device stores a control procedure to be implemented in an image reading device that comprises an infrared component separator that separates the color components of an image light flux passing through a transmissive original into an infrared component; an infrared image-capturing device that outputs an infrared image signal by capturing the infrared component of the image light flux that has been separated by the infrared component separator; a visible component separator that separates the color components of the image light flux passing through the transmissive original into a visible component; a visible image-capturing device that outputs a visible image signal by capturing the visible component of the image light flux that has been separated by the visible component separator; an image forming optical system that forms an image of the transmissive original at the infrared image-capturing device or the visible image-capturing device; a focal adjustment device that adjusts the position of the image forming optical system relative to the transmissive original. In this storage medium, an image forming position decision-making procedure through which a position of the image forming optical system relative to the transmissive original is determined as a visible image forming position at which an image of the visible component of the image light flux is formed at the visible image-capturing device based upon the infrared image signal; and a control procedure through which focal adjustment device is controlled in conformance to the decision made through the image forming position decision-making procedure are stored.

In the storage medium, the image forming position decision-making procedure may include a procedure through which either the visible image signal or the infrared image signal is selected and the visible image forming position is determined in correspondence to the selected image signal. Alternatively, the image forming position decision-making procedure may include a procedure through which the visible image forming position is determined based upon the infrared image signal after a failure to determine the visible image forming position based upon the visible image signal occurs.

The visible image-capturing device may receive the visible component at a plurality of pixels and output a plurality of visible image signals each indicating an intensity level of the component received at the associated pixel. In this case, the image forming position decision-making procedure may preferably include a procedure through which the plurality of visible image signals output by the visible image-capturing device at a plurality of measuring points corresponding to the various distances set between the transmissive original and the image forming optical system are input, a procedure through which the largest contrast value representing the maximum value among the contrast values of the plurality of visible image signals is detected, and a procedure through which a decision is made that a failure to determine a visible image forming position has occurred if the largest contrast value is smaller than the threshold value.

If the image forming position decision-making procedure includes a procedure through which a visible image forming position is determined based upon the infrared image signal after a failure to determine a visible image forming position based on the visible image signal has occurred, the visible image-capturing device may be structured and the image forming position decision-making procedure may be implemented as follows. The visible image-capturing device receives the visible component at a plurality of pixels and outputs a plurality of visible image signals, each indicating an intensity level of the component received at the associated pixel. The image forming position decision-making procedure includes a procedure through which the plurality of visible image signals output by the visible image-capturing device at a plurality of measuring points corresponding to various distances set between the transmissive original and the image forming optical system are input, a procedure through which the largest contrast value representing the maximum value among the contrast values of the plurality of visible image signals is detected, a procedure through which a corrected largest contrast value is calculated by correcting the largest contrast value and a procedure through which it is decided that a failure to determine a visible image forming position has occurred if at least one of the contrast values at measuring positions outside a specific range which includes the measuring position corresponding to the largest contrast value exceeds the corrected contrast value.

BRIEF DESCRIPTION OF THE DRAWINGS

FIGS. 12A and 12B present a flowchart of another example of autofocusing executed by the image reading device shown in FIGS. 1–5;

FIG. 15 illustrates the principle applied when eliminating adverse effects of defects such as dirt, scratches and fingerprints from the image data;

FIG. 25 illustrates alignment;

FIG. 26 illustrates alignment;

FIG. 27 illustrates alignment;

FIG. 28 illustrates alignment;

DETAILED DESCRIPTION OF THE PREFERRED EMBODIMENTS

The following is an explanation of the embodiments of the present invention, given in reference to the attached drawings.

FIGS. 1–11 illustrate an embodiment of the image reading device according to the present invention.

Figure 1:
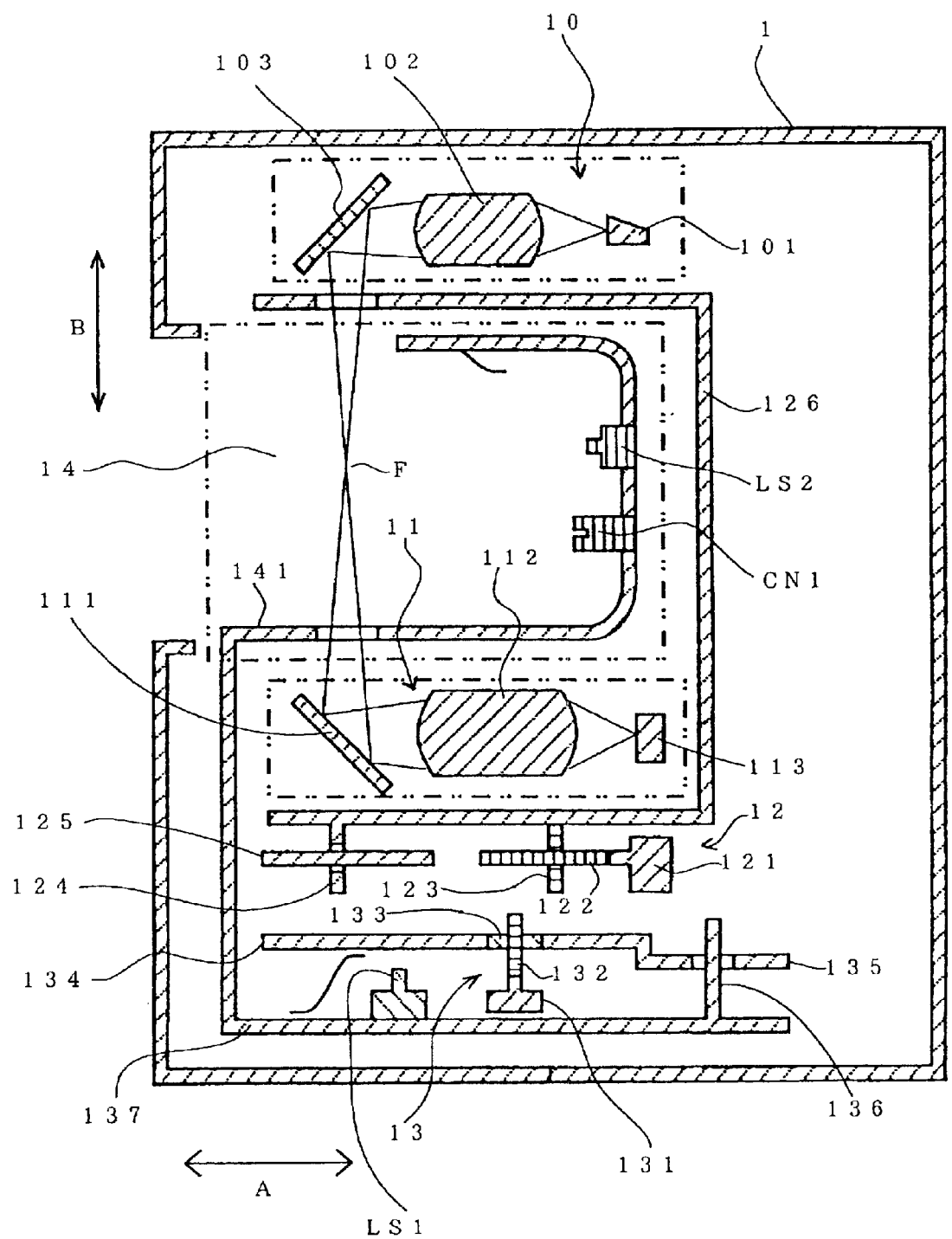
FIG. 1 illustrates the structure adopted in an embodiment of the image reading device according to the present invention.

FIG. 1 illustrates the mechanical structure of a main unit 1 of the image reading device adopting the present invention. As shown in FIG. 1, the main unit 1 primarily comprises an illuminating unit 10 that radiates light on an original, a reading unit 11 that receives light irradiated by the illuminating unit 10 and outputs image data, a scanning mechanism 12 that moves the illuminating unit 10 and the reading unit 11 along the sub-scanning direction indicated by the arrow A, a focusing mechanism 13 that moves the illuminating unit 10, the reading unit 11 and the scanning mechanism 12 along the direction indicated by the arrow B and an adapter insertion unit 14.

The illuminating unit 10 is constituted of a light source 101 that is capable of emitting light in R (red), G (green) and B (blue) and IR (infrared light), a projection lens 102 and a mirror 103. Light emitted by the illuminating unit 10 is transmitted through a film original set at an adapter (see FIG. 2) inserted at the adapter insertion unit 14 and reaches the reading unit 11.

The reading unit 11 is comprised of a mirror 111 which receives the light irradiated by the illuminating unit 10, an image forming lens 112 and a CCD line sensor 113. The image forming lens 112 forms an image from the film original in the vicinity of the light-receiving surface of the CCD line sensor 113. The CCD line sensor 113 receives the light that has been transmitted through the original (light in R (red), G (green), B (blue) and IR (infrared light)) at a plurality of pixels. The plurality of pixels are arrayed along a single column. The individual pixels sequentially output a plurality of sets of image data each indicating the intensity of the light received at one of the pixels.

The illuminating unit 10 is capable of selectively emitting light in R (red), G (green) or B (blue) or IR (infrared light). The image reading device obtains RGB image data for one line by engaging in R light emission/read, G light emission/read and B light emission/read.

In the present embodiment, the image reading device obtains visible image data for one line through light emission/read of visible light (in one color among R (red), G (green) and B (blue)) during an autofocus operation. During the autofocus operation, the image reading device obtains IR image data for one line through light emission/read of IR (infrared light). Then the image reading device selects either type of image data, and based upon the selected image data, engages in the autofocusing operation. It is to be noted that the number of colors used in the autofocusing operation using visible light is not limited to one.

The scanning mechanism 12 moves the illuminating unit 10 and the reading unit 11 together along the sub-scanning direction indicated by the arrow A. As shown in the figure, the scanning mechanism 12 is constituted of a stepping motor 121, a lead screw 122 directly connected with the rotating shaft of the stepping motor 121, a nut 123 engaged with the lead screw, a guide arm 124, a guide bar 125 slidingly engaged with the guide arm 124 and a scanning block 126 that integrally supports the nut 123 and the guide arm 124. Thus, as illustrated in the figure, the illuminating unit 10 and the reading unit 11 move together along the sub-scanning direction indicated by the arrow A in response to the rotation of the stepping motor 121.

The focusing mechanism 13 is constituted of a stepping motor 131, a lead screw 132 directly connected with the rotating shaft of the stepping motor 131, a nut 133 engaged with the lead screw 132, an AF block 134 with the nut 133 embedded therein, a guide arm 135 integrally coupled to the AF block 134 and a guide bar 136 slidingly engaged with the guide arm 135. The focusing mechanism 13 moves the AF block 134 along the focusing direction indicated by the arrow B as the stepping motor 131 rotates.

Although not shown in the figure, the AF block 134 and the scanning block 126 are linked with each other. As a result, as the AF block 134 moves in the focusing direction (the arrow B) in response to the rotation of the stepping motor 131 at the focusing mechanism 13, the scanning block 126 accordingly moves in the focusing direction (the arrow B). Thus, the position of a focal point F relative to a plate surface 141 changes in the focusing direction as the AF block 134 moves in the focusing direction (the arrow B). In addition, the scanning block 126 is capable of moving along the sub-scanning direction (the arrow A) relative to the AF block 134. Consequently, the position of the focal point F relative to the plate surface 141 changes as the scanning block 126 moves in the sub-scanning direction (the direction indicated by the arrow A).

In FIG. 1, a limit switch LS1 detects that the AF block 134 has moved closer to a position that is apart from a mechanical chassis 137 by a specific distance. When an adapter is inserted, a limit switch LS2 detects that the rear surface of the adapter has reached the furthest portion of the adapter insertion unit 14. When the adapter has been completely inserted, a connector CN1 becomes electrically connected with a connector provided at the adapter (see the connector CN2 in FIG. 2). It is to be noted that the electrical structure of the main unit 1 of the image reading device is to be explained later in reference to FIG. 5.

Figure 2:
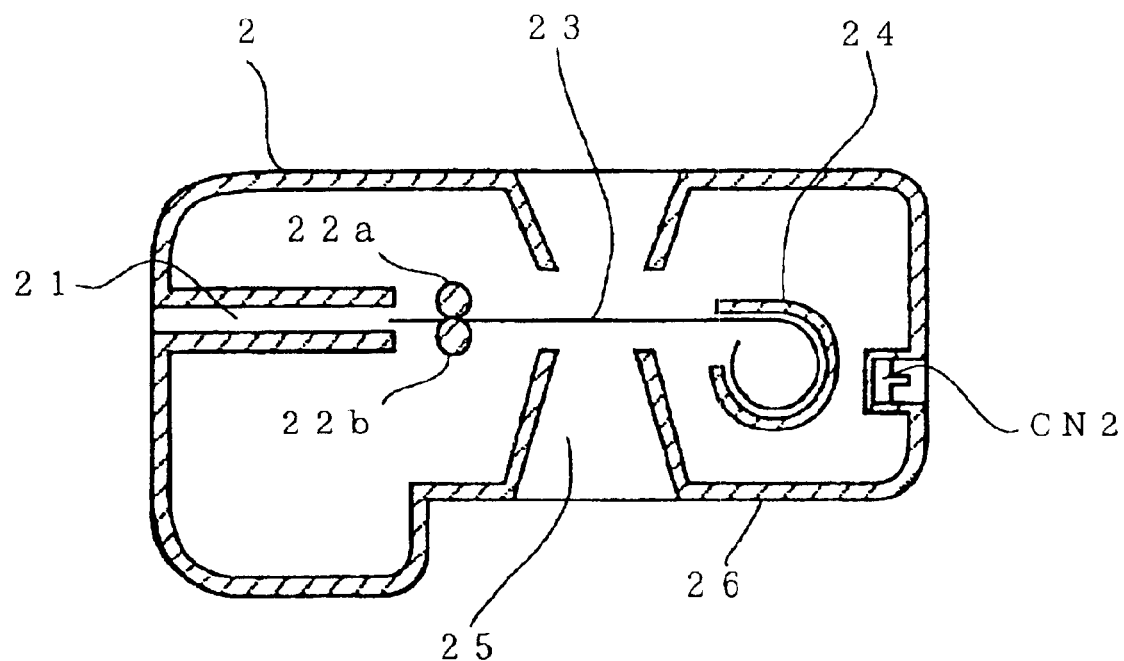
FIG. 2 shows an example of the adapter inserted at the adapter insertion unit.

FIG. 2 is a functional block diagram of an example of the adapter 2. The adapter 2 is inserted at the adapter insertion unit 14 shown in FIG. 1. The adapter 2 may be any of various types of adapters that correspond to different types of film originals (e.g., 35 mm strip film, APS film).

The adapter 2 shown in FIG. 2 is used in combination with an original constituted of 35 mm strip film 23. The adapter 2 shown in FIG. 2 comprises an intake passage 21 through which the strip film 23 is guided into the adapter 2, a pair of rollers 22a and 22b that deliver the strip film 23 that has been taken in by clamping it, a windup guide 24 that winds up the strip film 23 therein, a read hole 25 through which light emitted by the illuminating unit 10 is transmitted, a connector CN2 which is to be electrically connected with the connector CN1 (see FIG. 1) of the main unit 1 and a motor M (see FIG. 3) that drives to rotate the roller 22b. An adapter bottom surface 26 shown in FIG. 2 slides against a plate surface 141 when the adapter 2 is inserted through the adapter insertion unit 14 of the main unit 1.

The adapter 2 allows the illuminating light from the illuminating unit 10 to be transmitted through the read hole 25. Thus, the illuminating light from the illuminating unit 10 is transmitted through the strip film 23 set within the adapter 2. As a result, the image photographed on the strip film 23 is formed near the light-receiving surface of the CCD line sensor 113 by the mirror 111 and the image forming lens 112 in the reading unit 11.

Figure 3:
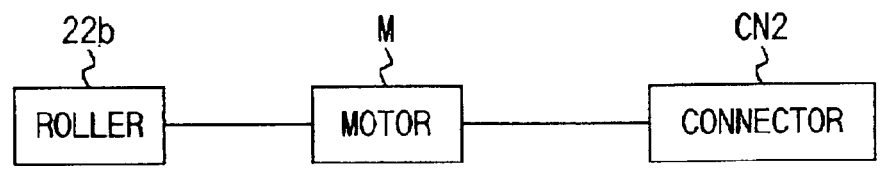
FIG. 3 is a block diagram illustrating the circuits incorporated in the adapter.

FIG. 3 is a block diagram illustrating the circuits incorporated in the adapter 2. As shown in the figure, the motor M rotates the roller 22b. The motor M becomes connected electrically with the central control circuit (reference number 151 in FIG. 5) provided in the main unit 1 when the connector CN1 at the main unit 1 and the connector CN2 at the adapter 2 are electrically connected with each other. Thus, the motor M is controlled by the central control circuit (reference number 151 in FIG. 5) of the main unit 1.

Figure 4:
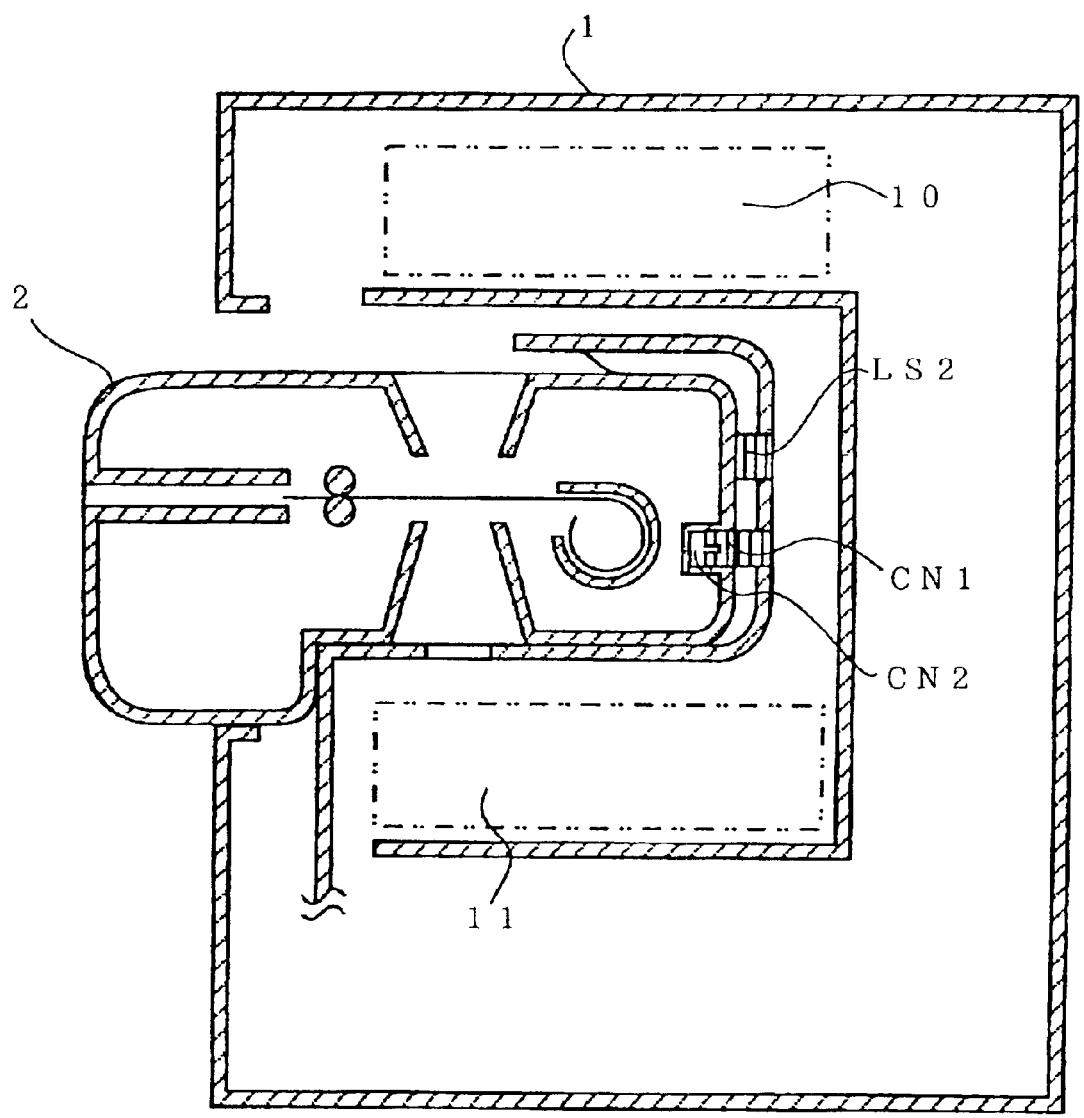
FIG. 4 illustrates the main unit of the image reading device with the adapter 2 inserted therein.

FIG. 4 illustrates a state in which the adapter 2 is inserted at the main unit 1 of the image reading device. In the state illustrated in FIG. 4, the connector CN1 at the main unit 1 and the connector CN2 at the adapter 2 are electrically connected with each other, thereby setting the limit switch LS1 at the main unit 1 to an ON state.

Figure 5:
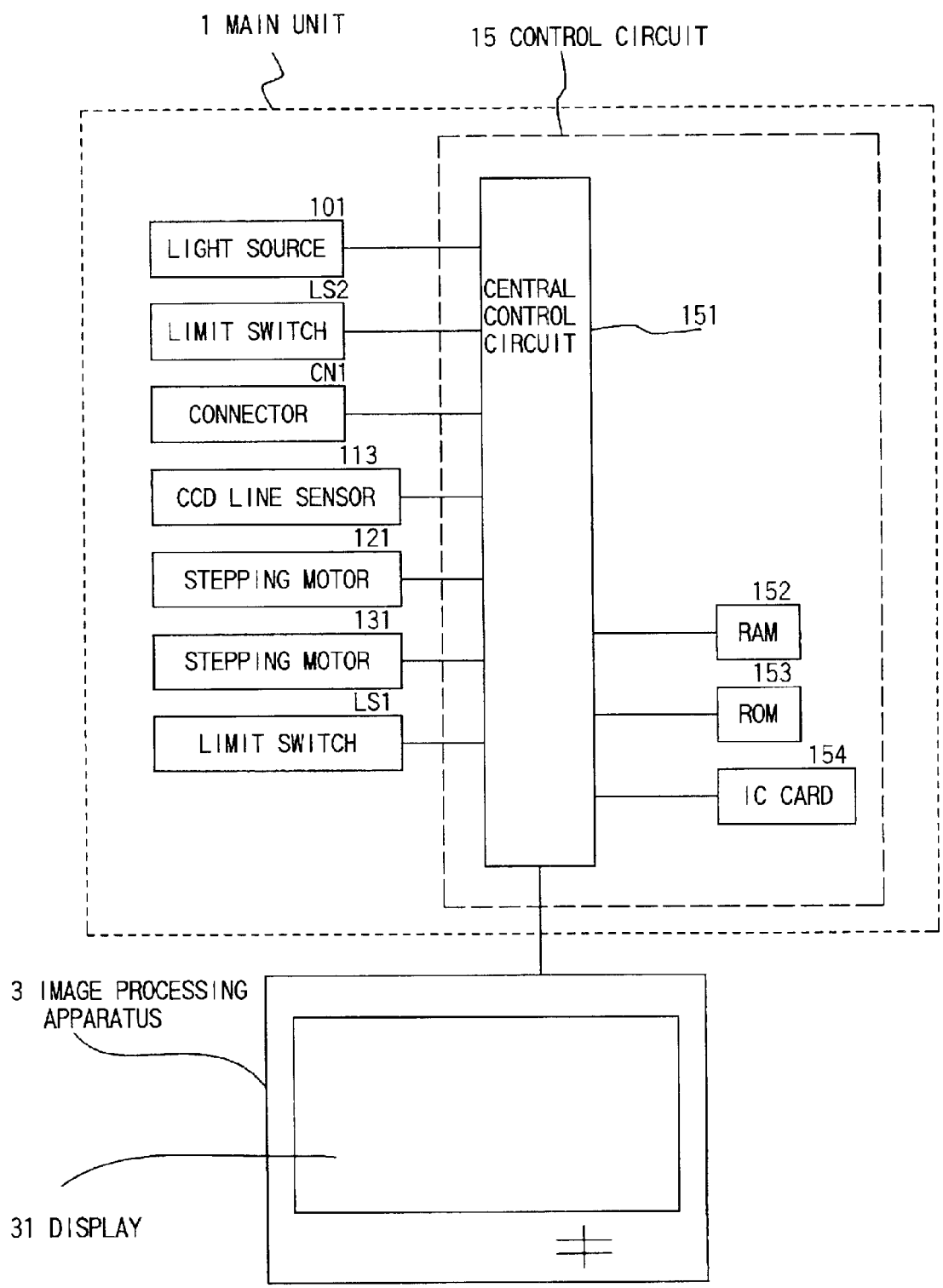
FIG. 5 is a block diagram illustrating the electrical structure of the main unit of the image reading device.

FIG. 5 is a block diagram illustrating the electrical structure of the main unit 1 of the image reading device. In FIG. 5, a control circuit 15 controls the operation of the main unit 1 of the image reading device. The control circuit 15 is comprised of the central control circuit 151, a RAM 152, a ROM 153 and an IC card 154. The central control circuit 151 is electrically connected with the light source 101, the limit switches LS1 and LS2, the connector CN1, the CCD line sensor 113 and the stepping motors 121 and 131.

The central control circuit 151 executes a program for controlling the overall operation of the image reading device. The RAM 152 is a memory that temporarily stores data necessary for the execution of the program. The ROM 153 is a memory that stores the program executed by the central control circuit 151. The IC card 154 is a detachable memory which stores auxiliary data added to the program.

The program may be stored in the IC card 154, instead. In that case, the program is read out from the IC card 154 and is temporarily stored in the RAM 152. The central control circuit 151 reads out the program temporarily stored in the RAM 152 and executes it.

Instead of the IC card 154, a detachable storage medium such as a CD ROM may be used. In such a case, the program and the auxiliary data stored in the detachable storage medium are read out from the detachable storage medium and temporarily stored in the RAM 152. The central control circuit 151 reads out the program temporarily stored in the RAM 152 and executes it.

As illustrated in FIG. 5, an image processing apparatus 3 is electrically connected with the main unit 1 of the image reading device. The image processing apparatus 3 is provided with a display 31. Consequently, in this embodiment, an image read by the image reading device is displayed at the display 31 of the image processing apparatus 3. A host computer such as a personal computer may be electrically connected in place of the image processing apparatus 3.

In the structure described above, color separation is achieved by illuminating the strip film 23 with light in different colors (R (red), G (green), B (blue), IR (infrared light)). However, color separation may be achieved instead by illuminating the strip film 23 with light emitted by a white color source and allowing the light to be transmitted through color separation filters.

More specifically, a turret-type color separation filter may be provided between the strip film 23 and the CCD line sensor 113. The turret type color separation filter is provided with a disk-shaped filter array base plate. At the filter array base plate, an R filter, a G filter, a B filter and an IR filter are arrayed in a radial pattern.

The R filter allows only the red color component to be transmitted. The G filter allows only the green color component to be transmitted. The B filter allows only the blue color component to be transmitted. The IR filter allows only the infrared component to be transmitted. The central control circuit 151, for instance, switches filters each time a read of a given color is completed.

Instead of a turret filter, a rectangular filter may be employed. In a rectangular filter, an R filter, a G filter, a B filter and an IR filter are arrayed in a single column. By moving the rectangular filter along the direction of the column, color switching is achieved.

Color separation may further be achieved by using a four-line sensor. At one of the line light-receiving units, an R filter is provided. In another line light-receiving unit, a G filter is provided. A B filter is provided in yet another line light-receiving unit. An IR filter is provided in another line light-receiving unit. As a result, the light-receiving unit in each line outputs an image signal indicating the color component of the corresponding filter.

The image reading device described above executes autofocusing in a state in which the adapter 2 illustrated in FIG. 2 is inserted. The following is an explanation of autofocusing executed by the image reading device in accordance with the program mentioned above.

Figure 6A:
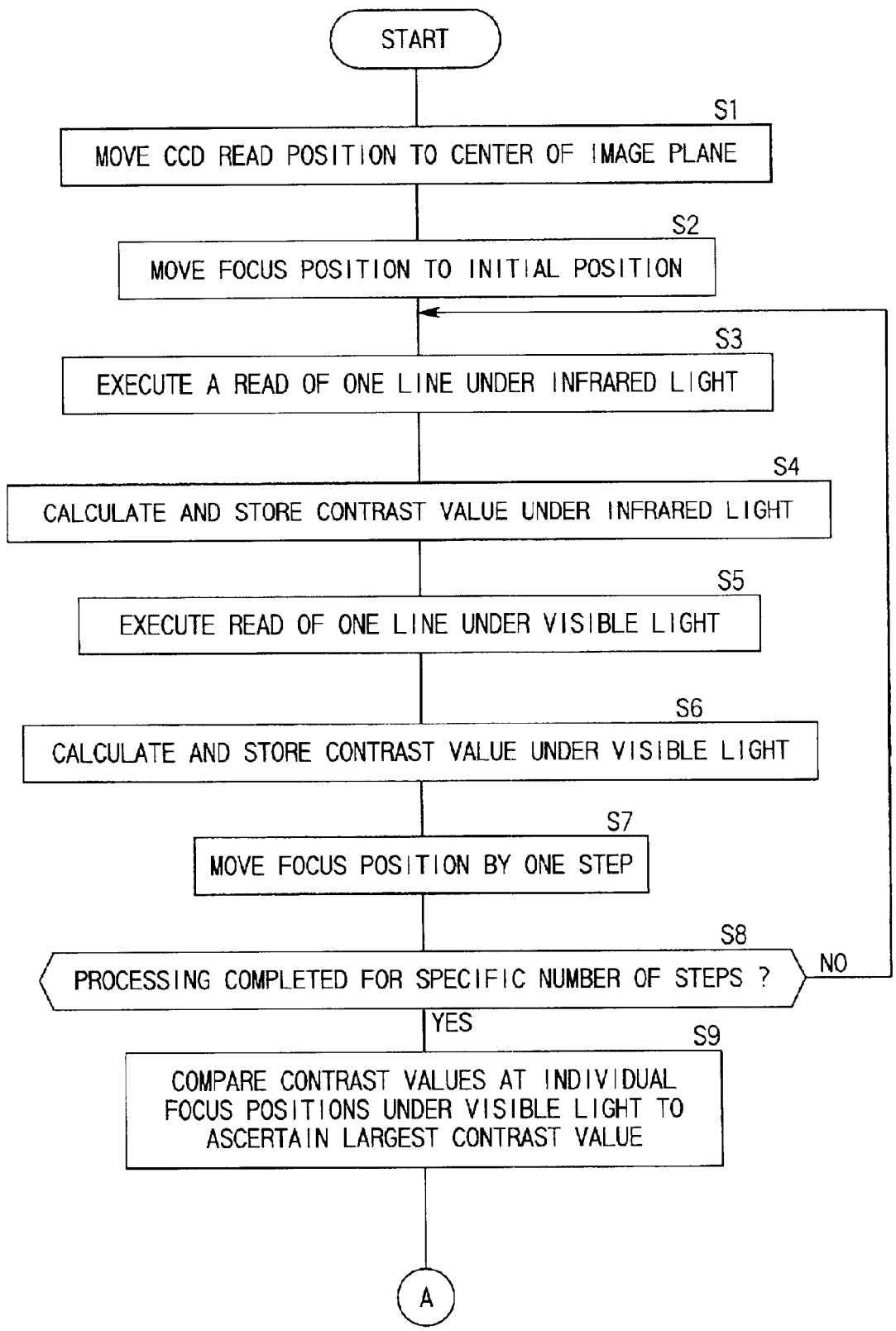
FIGS. 6A and 6B present a flowchart representing an example of autofocusing executed by the image reading device shown in FIGS. 1–5.
Figure 6B:
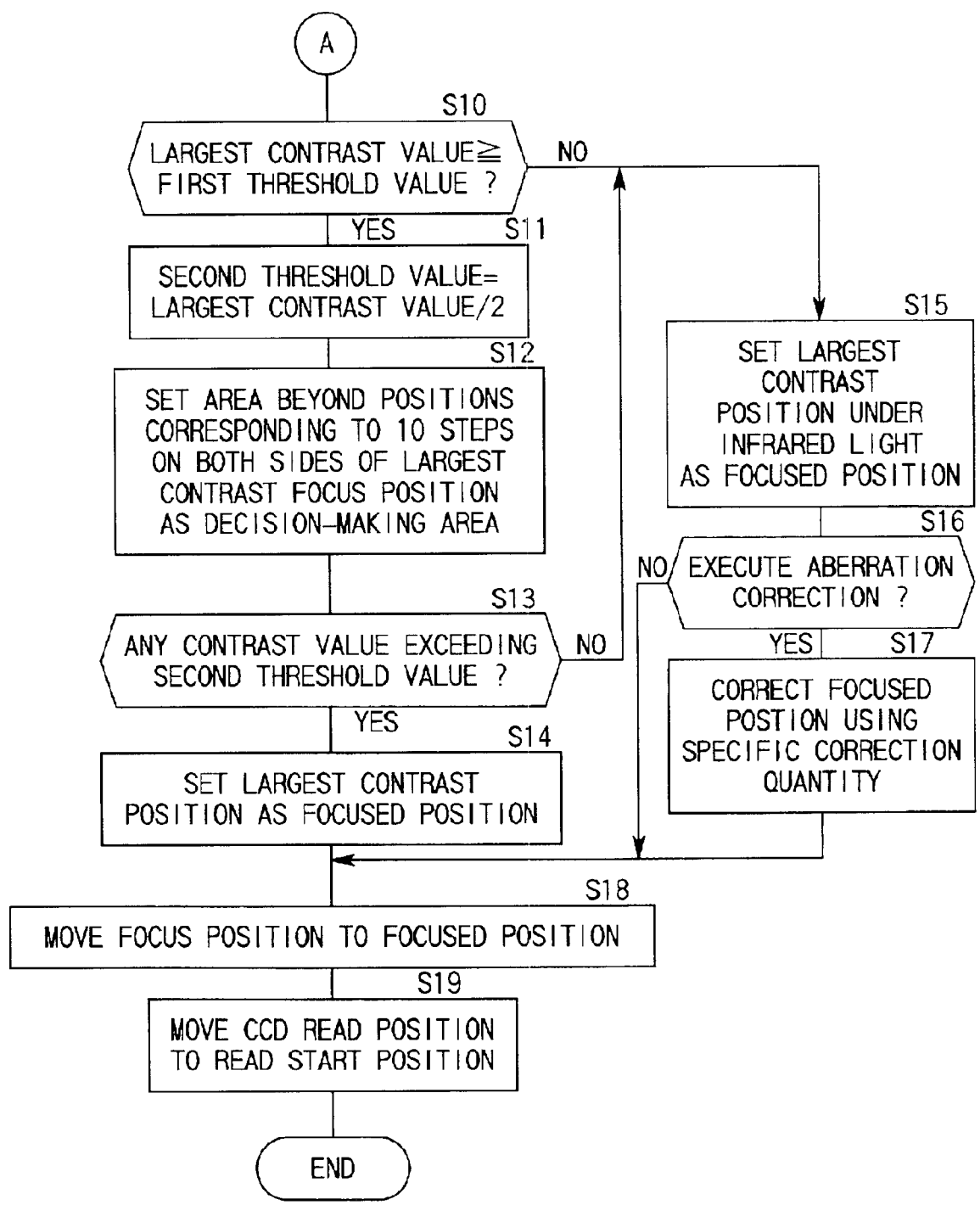

FIGS. 6A and 6B present a flowchart representing an embodiment of autofocusing operation executed by the image reading device illustrated in FIGS. 1–5.

In step S1, the central control circuit 151 implements control on the stepping motor 121 in the scanning mechanism 12 so that the read position of the CCD line sensor 113 is set near the center of a selected frame of the strip film 23.

In step S2, the central control circuit 151 positions the AF block 134 at the initial position by implementing control on the stepping motor 131 in the focusing mechanism 13. The initial position may be, for instance, the lowest order (along the direction indicated by the arrow B) position that can be detected by the limit switch LS1.

In step S3, the central control circuit 151 causes the light source 101 of the illuminating unit 10 to emit infrared light. Next, the central control circuit 151 engages the CCD line sensor 113 in the reading unit 11 in an execution of image data read for one line. It is to be noted that in this embodiment, the CCD line sensor 113 outputs image data corresponding to 500 contiguous pixels among the numerous pixels provided at the CCD line sensor 113. The image data thus output correspond to one line in the vicinity of the center of the frame in the strip film 23.

In step S4, the central control circuit 151 calculates a contrast value obtained under the infrared light and stores the contrast value thus ascertained in the RAM 152, based upon the image data corresponding to the individual pixels read at the initial position. The contrast value is stored at the address in the RAM corresponding to the initial position. The procedure through which the contrast value is calculated is to be explained in detail later in reference to FIG. 11.

In step S5, the central control circuit 151 causes the light source 101 in the illuminating unit 10 to emit light in one color among R (red), G (green) and B (blue). It is to be noted that the optimal color light to be emitted among R (red), G (green) and B (blue) is determined in conformance to the design of the reading optical system. Then, the central control circuit 151 engages the CCD line sensor 113 in the reading unit 11 in an execution of image data read for one line. During this process, the CCD line sensor 113 outputs image data corresponding to 500 contiguous pixels among the numerous pixels provided at the CCD line sensor 113. The image data thus output correspond to one line in the vicinity of the center of the frame in the strip film 23.

In step S6, the central control circuit 151 calculates a contrast value obtained under the visible light and stores the contrast value thus ascertained in the RAM 152, based upon the image data corresponding to the individual pixels read at the initial position. The contrast value is stored at the address in the RAM corresponding to the initial position.

Next, in step S7, the central control circuit 151 moves up the AF block 134 by one step (the arrow B) by controlling the stepping motor 131 in the focusing mechanism 13. In this embodiment, the stepping motor 131 moves the AF block 134 to a measuring position one step up in response to receiving four pulses.

In step S8, the central control circuit 151 makes a decision as to whether or not the AF block 134 has moved from the initial position by a predetermined number of steps. If it is decided that the AF block 134 has not moved by the specific number of steps, the central control circuit 151 repeats the processing in steps S3–S8. When the central control circuit 151 decides that the AF block 134 has moved by the predetermined number of steps, the operation proceeds to step S9.

In step S9, the central control circuit 151 reads out the contrast values obtained under the visible light stored in the RAM 152 and compares them to ascertain the largest value among the contrast values obtained under the visible light. The central control circuit 151 then ascertains the focus position corresponding to the largest contrast value obtained under the visible light.

In step S10, the central control circuit 151 makes a decision as to whether or not the largest contrast value ascertained in step S9 is equal to or larger than a predetermined first threshold value. If it is decided in step S10 that the largest contrast value is equal to or larger than the first threshold value, the central control circuit 151 proceeds to engage in the processing in step S11. If it is decided in step S10 that the largest contrast value is smaller than the first threshold value, the central control circuit 151 proceeds to engage in the processing in step S15.

The explanation proceeds on the assumption that the largest contrast value has been determined to be equal to or larger than the first threshold value.

In step S11, the central control circuit 151 sets a contrast value which is ½ of the largest contrast value ascertained in step S9 as a second threshold value. In step S12, the central control circuit 151 sets a decision-making area that extends over both sides of the focus position corresponding to the largest contrast value ascertained in step S9 excluding the focus positions corresponding to 10 steps around the focus position with the largest contrast value.

In step S13, the central control circuit 151 makes a decision as to whether or not there is any contrast value that exceeds the second threshold value in the decision-making area set in step S12. If it is decided that there is no contrast value exceeding the second threshold value, the central control circuit 151 proceeds to engage in the processing in step S14. If it is decided, on the other hand, that there is a contrast value exceeding the second threshold value, the central control circuit 151 proceeds to engage in the processing in step S15.

The explanation proceeds on the assumption that it has been decided that there is no contrast value exceeding the second threshold value.

In step S14, the central control circuit 151 sets the focus position corresponding to the largest contrast value ascertained in step S9 as the focused position.

In step S18, the central control circuit 151 moves the focus position to the autofocus position by controlling the stepping motor 131 in the focusing mechanism 13.

In step S19, the central control circuit 151 controls the stepping motor 121 of the scanning mechanism 12 to move the illuminating unit 10 and the reading unit 11 to the associated read start positions. As a result, the CCD line sensor 113 is enabled to start scanning of the entire plane of the image from the read start position.

As explained above, the central control circuit 151 proceeds to engage in the processing in step S15 if it is decided in step S10 that the largest contrast value ascertained in step S9 is smaller than the first threshold value. Likewise, the central control circuit 151 proceeds to engage in the processing in step S15 if it is decided in step S13 that there is a contrast value that exceeds the second threshold value.

When the operation is to proceed from step S10 to step S15, the largest contrast value ascertained in step S9 is smaller than the first threshold value and, therefore, the focus position corresponding to the largest contrast value may not be a true focus position. Accordingly, the central control circuit 151 proceeds to the processing in steps S15–S17 to execute autofocusing with infrared light.

When the operation is to proceed from step S13 to step S15, the change in the contrast value occurring under the visible light is not normal and, therefore, there is the possibility that the focus position ascertained in step S9 is not a true focused position. Accordingly, the central control circuit 151 proceeds to the processing in steps S15–S17 to execute autofocusing with infrared light.

In step S15, the central control circuit 151 reads out the contrast values obtained under the infrared light stored in the RAM 152 and compares them to ascertain the largest value among the contrast values obtained under the infrared light. The central control circuit 151 ascertains the focus position corresponding to the largest contrast value under the infrared light and sets the focus position as the focused position.

The operation proceeds as described above since autofocusing under infrared light makes it possible to determine a more stable focused position compared to autofocusing performed under visible light for the following reason. Namely, contrast value measurement under infrared light is hardly affected by the character of the image on the film.

Figure 7:
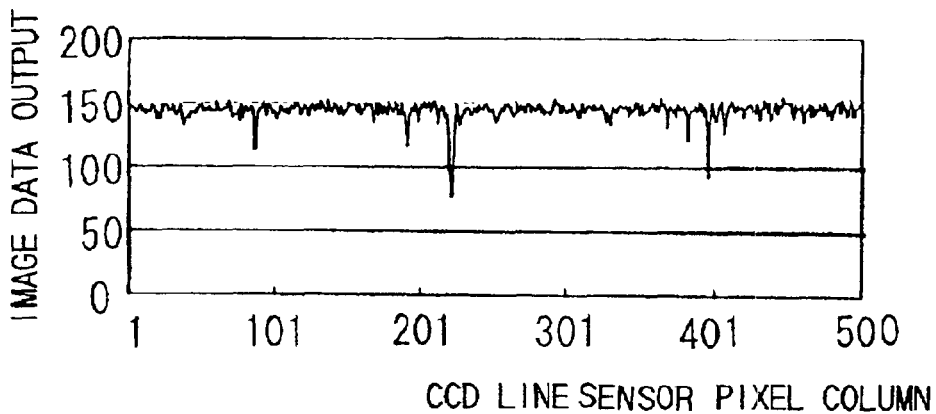
FIG. 7 presents an example of image data of a dark image such as a night scene on film with a boundary where the image character changes drastically, at the focused position.
Figure 30:
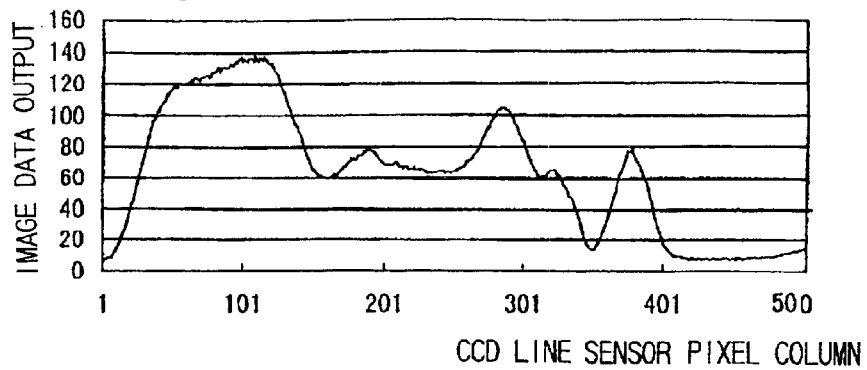
FIG. 30 presents an example of image data for one line obtained at a defocused position (non-focused position) by a CCD line sensor employed as the image-capturing element.
Figure 31:
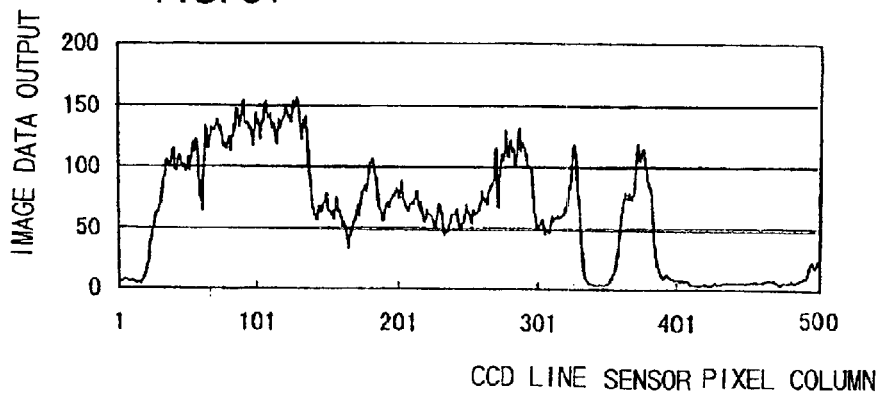
FIG. 31 presents an example of image data for one line obtained at the focused position by a CCD line sensor employed as the image-capturing element.

FIG. 7 presents an example of image data (an output from the CCD line sensor 113) obtained at the focused position corresponding to a dark image such as a night scene on film with a boundary where the character of the image changes drastically. As shown in the figure, when infrared light is used, differences in the output value between adjacent pixels at the CCD line sensor 113 are large at the focused position even in the case of a dark image or the like. In other words, the contrast value measurement performed under infrared light accurately reflects indentations and projections attributable to particles on the film at the focused position. Consequently, the contrast value is Large. It is to be noted that the relationship between the vertical axis and the horizontal axis in FIG. 7 is the same as that in FIG. 30.

Figure 8:
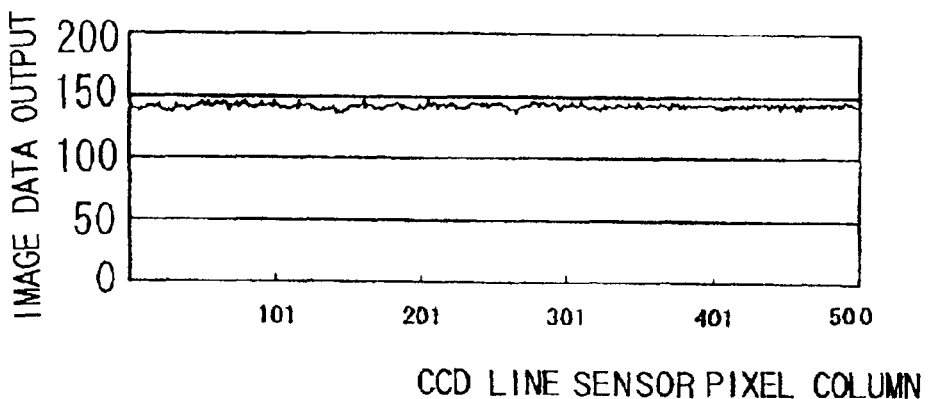
FIG. 8 presents an example of image data of a dark image such as a night scene on film with a boundary where the image character changes drastically, at a defocused (non-focused) position.

FIG. 8 presents an example of image data (an output from the CCD line sensor 113) obtained at a defocused position (non-focused position) corresponding to a dark image such as a night scene on film with a boundary where the character of the image changes drastically. In this case, since the image data are obtained at the non-focused position, differences in the output value between adjacent pixels at the CCD line sensor are small. In other words, since focusing is not complete, the image reading device cannot accurately read the indentations and projections at the surface of the original as image data. As a result, the contrast value is small. It is to be understood that the relationship between the vertical axis and the horizontal axis in FIG. 8 is the same as that in FIG. 30.

Figure 9:
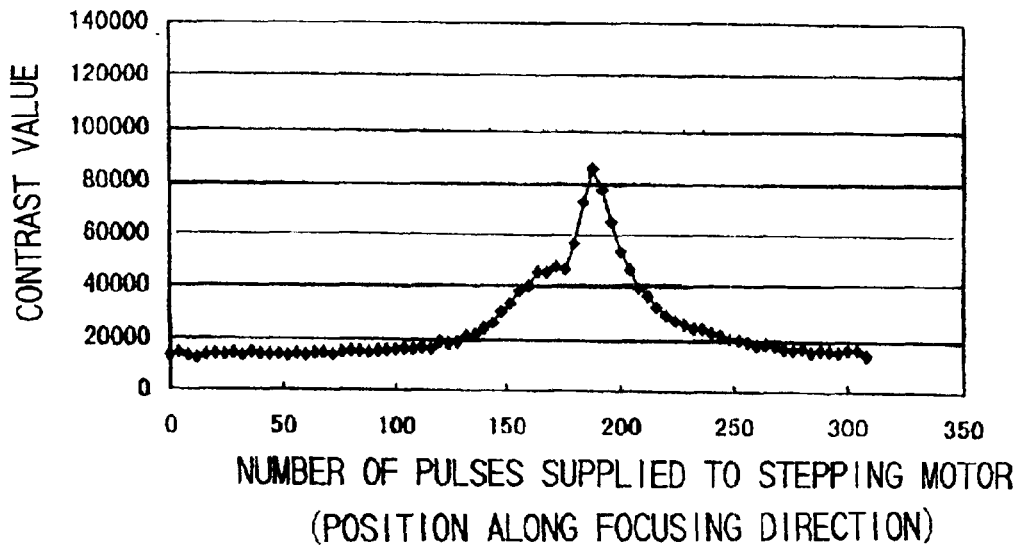
FIG. 9 shows an example of the relationship between the focus position (the horizontal axis) and the contrast value (the vertical axis) under infrared light, of a dark image such as a night scene with a boundary where the image character changes drastically.
Figure 32:
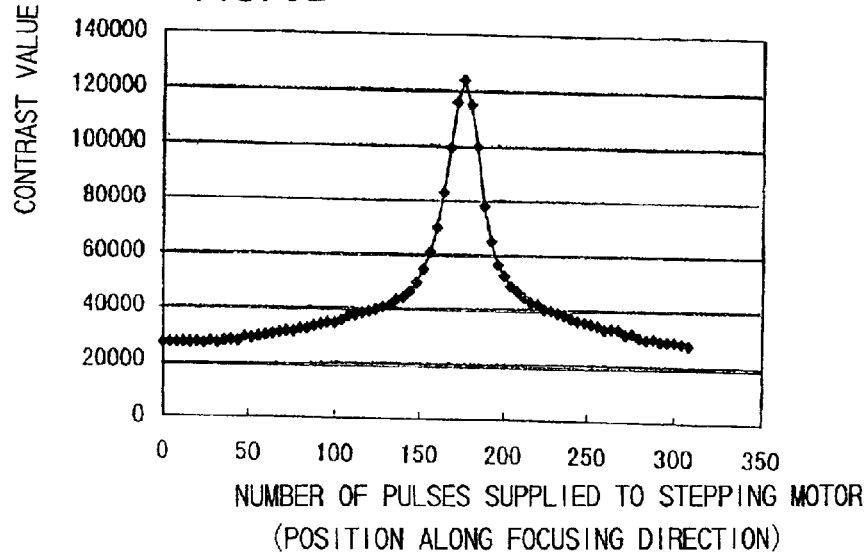
FIG. 32 presents an example of changes in the distance made in units of single steps (the horizontal axis) and changes in the contrast value (the vertical axis), with respect to the image data shown in FIGS. 30 and 31.
Figure 33:
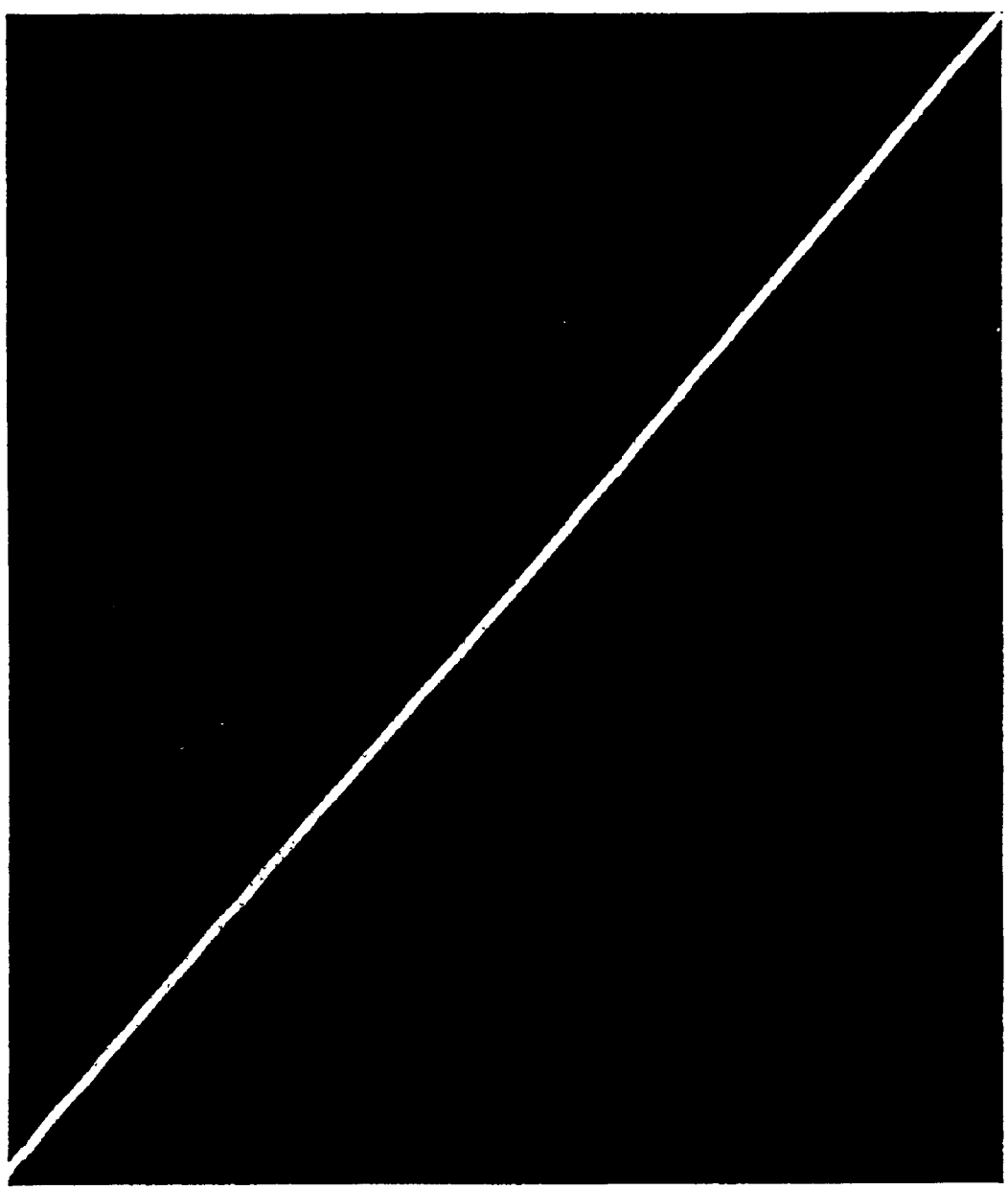
FIG. 33 presents an example of the film original on which a comet in the night sky is photographed.
Figure 34:
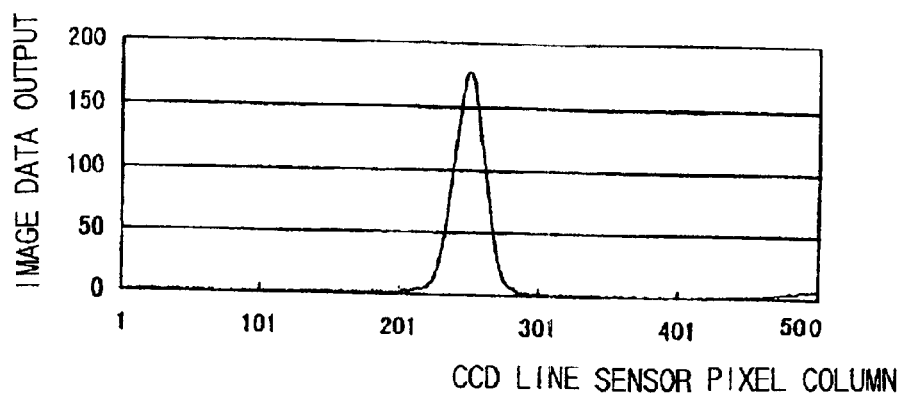
FIG. 34 presents image data for one line obtained at a defocused position (non-focused position) when the image shown in FIG. 33 is read by a CCD line sensor employed as the image-capturing element.
Figure 35:
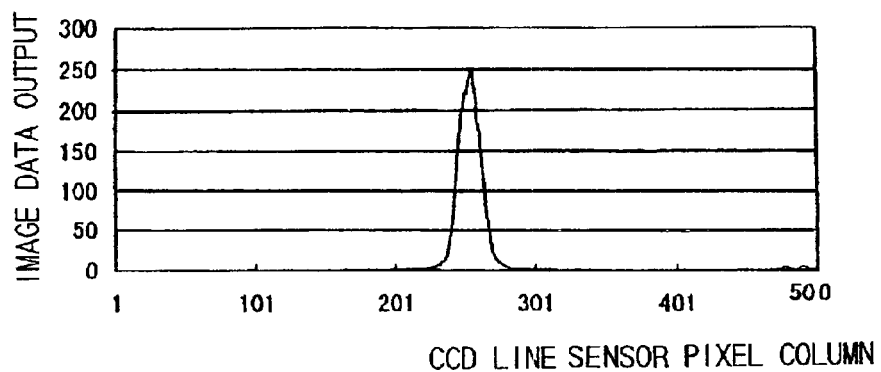
FIG. 35 illustrates image data for one line obtained at the focused position when the image shown in FIG. 33 is read by a CCD line sensor employed as the image-capturing element.
Figure 36:
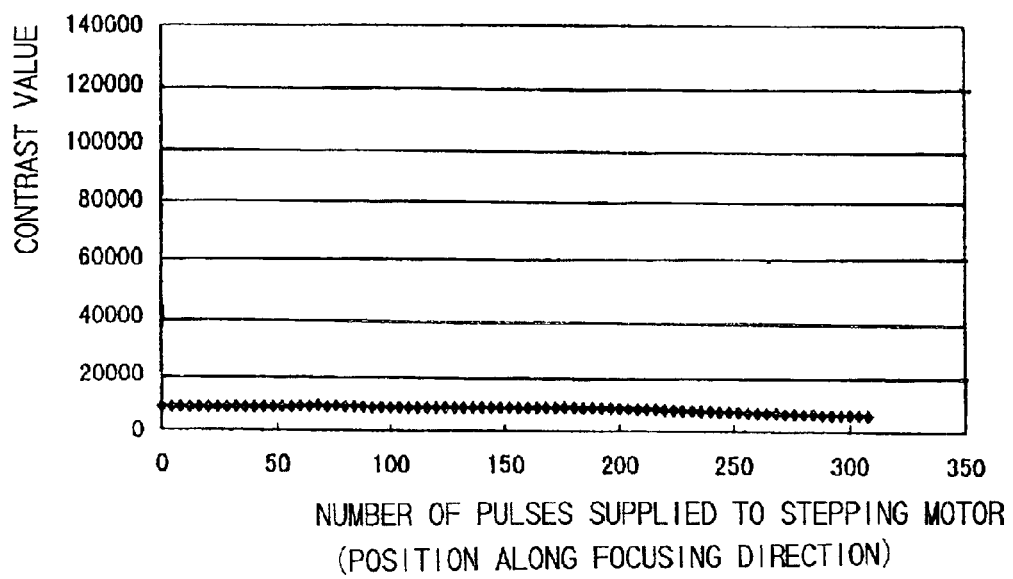
FIG. 36 illustrates the relationship between the changes in the distance made in units of single steps (the horizontal axis) and changes in the contrast value (the vertical axis) with respect to the image data shown in FIGS. 34 and 35.

FIG. 9 presents an example of the relationship between the focus position (the horizontal axis) and the contrast value (the vertical axis) obtained under infrared light, with regard to a dark image such as a night scene or an image at a boundary where the image character changes drastically. As shown in FIG. 9, by performing autofocusing under infrared light, it is possible to ascertain the focused position in correspondence to the peak point of the contrast value, regardless of the character and the like of the film image. It is again to be noted that the relationship between the vertical axis and the horizontal axis in FIG. 9 is the same as that in FIG. 32.

Next, in step S16, the central control circuit 151 makes a decision as to whether or not an aberration correction is to be executed.

Figure 10:
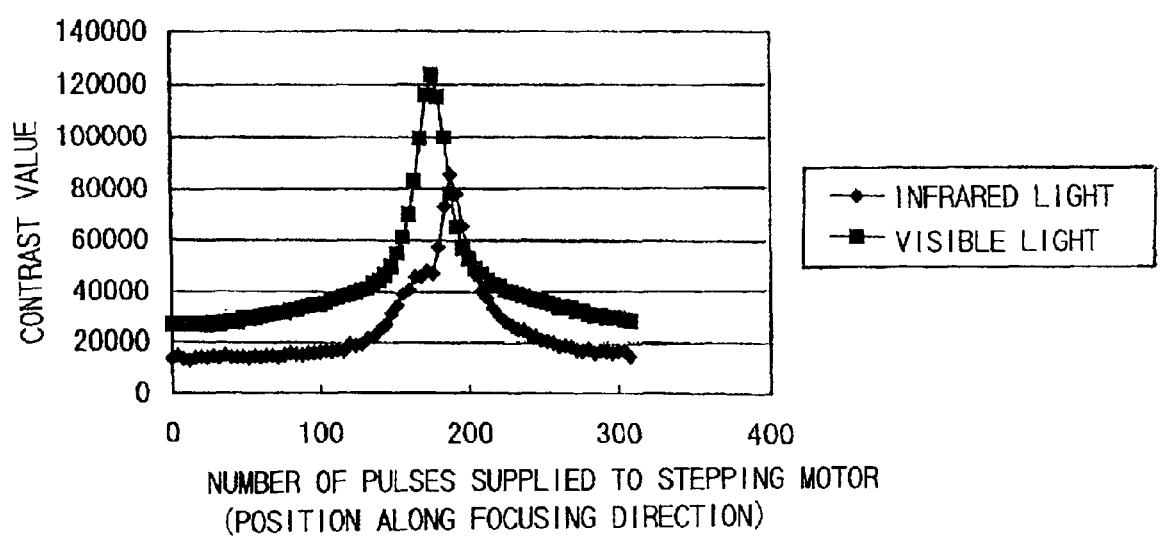
FIG. 10 illustrates an incidence of displacement occurring between the focused position under visible light and the focused position under infrared light, which is attributable to the axial chromatic aberration.

The aberration correction in this context means the following. Namely, as illustrated in FIG. 10, a displacement occurs between the focused position (the contrast peak position) under visible light and the focused position (contrast peak position) under infrared light, which is normally attributable to axial chromatic aberration. The image reading device reads images under visible light. Thus, if the image reading device reads an image at the focused position determined through autofocusing performed under infrared light, undefined image data may be output due to the displacement in the focus position. The degree to which the image data become undefined depends upon the design of the optical system and the like. Consequently, depending upon intended use, the extent of this lack of definition in the image data may be allowable or not allowable in the image reading device.

The degree of displacement between the visible light focused position and the infrared light focused position can be set at an almost constant value through optical design. Accordingly, the manufacturer of the image reading device stores the displacement quantity in a memory such as the ROM 153. This enables the image reading device to correct the focused position obtained under infrared light when reading a film image to adjust it closer to the visible light focused position by implementing the correction based upon the displacement quantity. In this case, the user should be allowed to determine whether or not a correction is to be performed on a driver software program.

The aberration correction may be achieved through the following method, instead. Namely, the image reading device detects the visible light focused position and the infrared light focused position when starting an image read and detects the quantity of displacement between them. The image reading device stores the displacement quantity thus detected in memory such as RAM. When executing the image read, the image reading device reads out the displacement quantity from the memory and adjusts the focused position obtained under the infrared light by the displacement quantity stored.

If it is decided in step S16 that an aberration correction is to be performed, the central control circuit 151 proceeds to step S18 via step S17. If an aberration correction is not to be performed, the central control circuit 151 proceeds to step S18 directly. The processing performed in steps S18 and S19 has been explained earlier.

Figure 11:
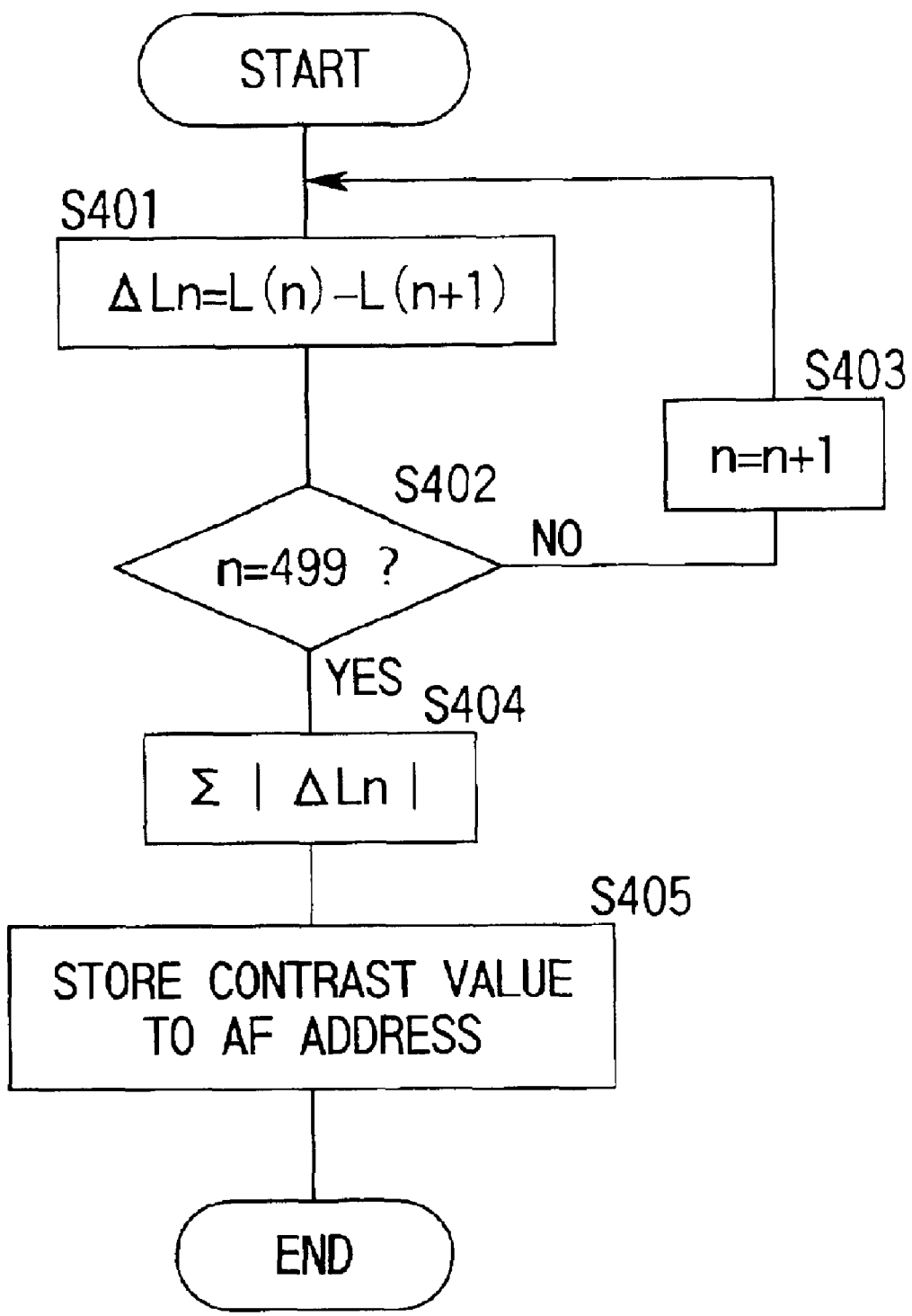
FIG. 11 is a flowchart of the calculation procedure implemented by the central control circuit to obtain contrast values.

FIG. 11 is a flowchart of the calculation procedure through which the central control circuit 151 obtains a contrast value in step S4 or S6 in FIG. 6A. In the figure, L(n) (n=1–500) represents an image data value obtained by performing A/D conversion on a set of image data output by each of the pixels (500 pixels) at the CCD line sensor 113.

As shown in steps S401, S402 and S403, the central control circuit 151 repeats an operation to obtain the sums of the absolute values representing the differences between values indicated by the image data corresponding to the adjacent pixels for all the 500 pixels. Next, in step S404, the central control circuit 151 adds up all the sums of the absolute values representing the differences between values indicated by the image data corresponding to the adjacent pixels thus obtained to ascertain the contrast value. Then the operation proceeds to step S405, in which the central control circuit 151 stores the contrast value obtained in step S405 at the address in the RAM 152 corresponding to the focus position.

By implementing the processing procedure described above, the following advantages are achieved.

(1) The image reading device can determine the focused position by using infrared light if it fails to determine the focused position under visible light.
(2) The image reading device can accurately ascertain the focused position of a dark image such as a night scene on film with a boundary where the image character changes drastically.
(3) The image reading device can correct the difference between the visible light focused position and the infrared light focused position attributable to axial chromatic aberration and, as a result, it can ascertain the focused position with a higher degree of accuracy.

Consequently, the image reading device that executes the processing procedure described above is capable of outputting a high quality image.

Figure 12B:
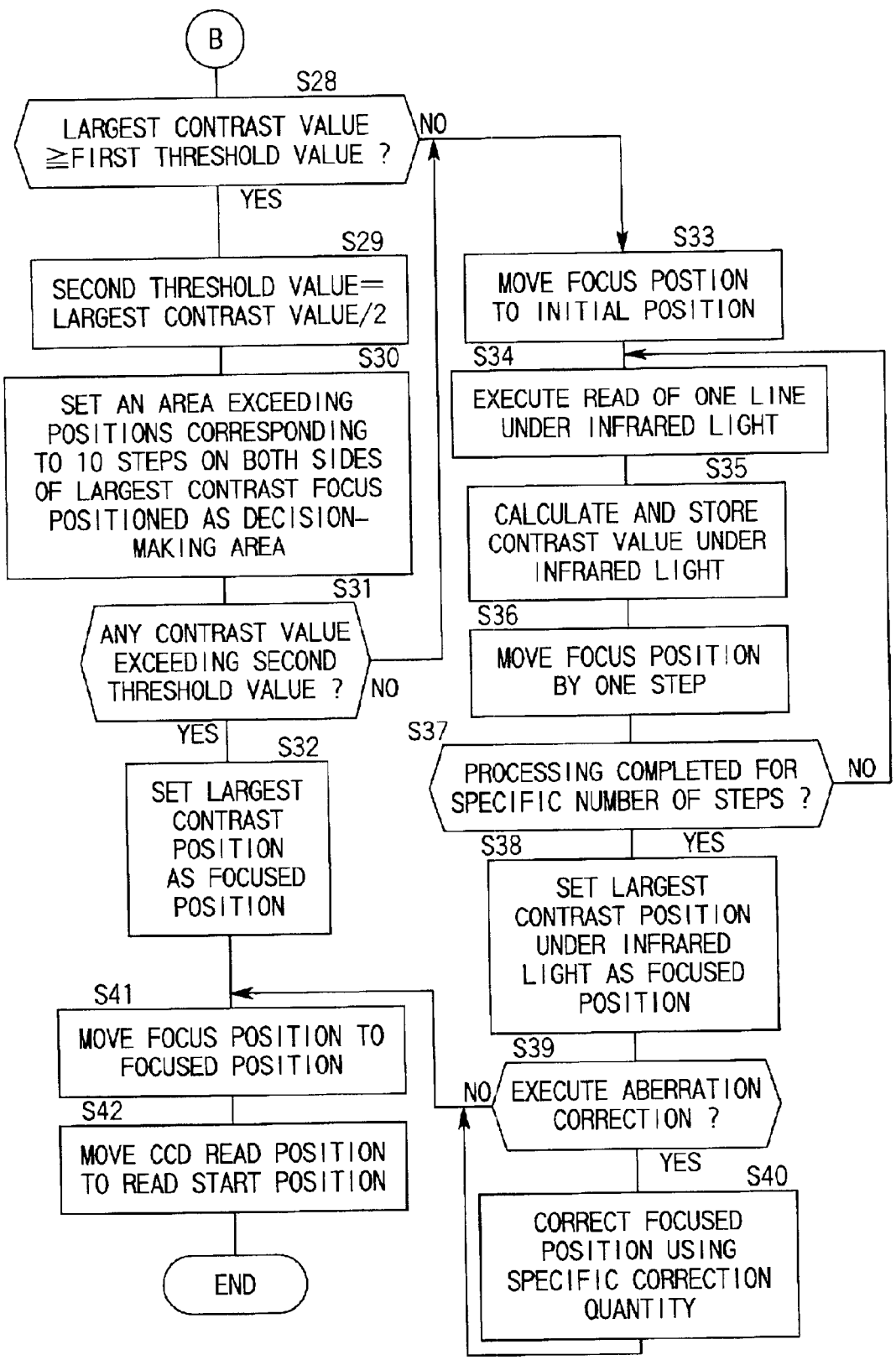

FIGS. 12A and 12B present a flowchart presenting another example of the autofocusing operation executed by the image reading device shown in FIGS. 1–5.

In steps S21–S26 shown in FIG. 12A, the central control circuit 151 executes processing identical to that performed in steps S1, S2, S5, S6 and S7 in the embodiment shown in FIG. 6A. Namely, in this embodiment, the central control circuit 151 executes autofocusing by using visible light in steps S21–S26.

Next, in step S27, processing similar to that performed in step S9 in the first embodiment shown in FIG. 6A is performed. Namely, the central control circuit 151 reads out the contrast values obtained under visible light that are stored in the RAM 152 and compares them to ascertain the largest contrast value obtained under visible light. The central control circuit 151 then ascertains the focus position corresponding to the largest contrast value under the visible light.

Then, in steps S28–S32 the central control circuit 151 executes processing similar to that performed in steps S10–S14 in the embodiment shown in FIG. 6B. In short, the central control circuit 151 makes a decision as to whether or not the focused position obtained by using the visible light has been determined normally. The criteria used to make a decision with respect to normal/abnormal are the same as those used in step S10 (S28) and step S13 (S31).

If it is decided in step S28 or S31 that the focused position has been determined in a normal manner by using the visible light, the central control circuit 151 proceeds to step S41 to engage in processing similar to that performed in step S18 shown in FIG. 6. Next, the central control circuit 151 proceeds to step S42 to engage in processing similar to that performed in step S19 before ending the processing.

If it is decided in steps S28 or S31 that the focused position determined by using the visible light is not normal, the central control circuit 151 proceeds to step S33. In steps S33–S38, the focused position is determined by using infrared light. This processing is similar to the processing performed in steps S2, S3, S4, S7, S8 and S9 in the first embodiment, except that infrared light is used instead of visible light.

Next, in steps S39 and S40, processing similar to that performed in steps S16 and S17 in the previous embodiment is performed. Namely, the central control circuit 151 makes a decision as to whether or not the displacement occurring between the visible light focused position (the contrast peak position) and the infrared light focused addition (the contrast peak position) attributable to the axial chromatic aberration is to be corrected. If an aberration correction is to be executed, the central control circuit 151 proceeds to engage in the processing in step S41 via step S40. If an aberration correction is not to be executed, the central control circuit 151 proceeds directly to engage in the processing in step S41. The aberration correction may be achieved through a method similar to that adopted in the previous embodiment. The processing performed in steps S41 and S42 has already been explained.

While the central control circuit 151 detects the visible light focused position first and then detects the infrared light focused position in the embodiment explained in reference to FIGS. 12A and 12B, the order of the detection may be reversed.

While the image reading device utilizes a CCD line sensor in the embodiments explained in reference to FIGS. 6A and 6B, and FIGS. 12A and 12B, the present invention is not limited to this example, and an area sensor may be employed, instead.

As is obvious from the explanation given above, the image reading device in the embodiment in FIGS. 12A and 12B achieves the following advantages.

(1) A focused position can be determined by using infrared light if the image reading device fails to determine the focused position under visible light.
(2) A focused position of a dark image such as a night scene on film with a boundary where the image character changes drastically can be accurately ascertained by the image reading device.
(3) The difference between the visible light focused position and the infrared light focused position attributable to axial chromatic aberration can be corrected and, as a result, the focused position can be ascertained with a higher degree of accuracy.

Consequently, the image reading device in this embodiment is capable of outputting a high quality image.

It is to be noted that the image reading device can be electrically connected with a host computer such as a personal computer as well as to the image processing apparatus 3 shown in FIG. 5, as mentioned earlier. In this case, the CPU of the host computer may be utilized instead of the central control circuit 151. In addition, a hard disk drive or a memory in the host computer may replace the IC card 154 and the RAM 152 shown in FIG. 5.

In such a configuration, the hard disk drive should have stored therein a program that executes the processing according to the flowchart in FIG. 6 or FIG. 12. Then the CPU in the host computer reads out the program from the hard disk drive and stores it in the memory in the host computer. This enables the CPU of the host computer to execute the program. It is to be noted that the program which is to be stored in the hard disk drive should be stored at a storage medium such as a CD ROM so that it can be set up in advance at the host computer.

Figure 13:
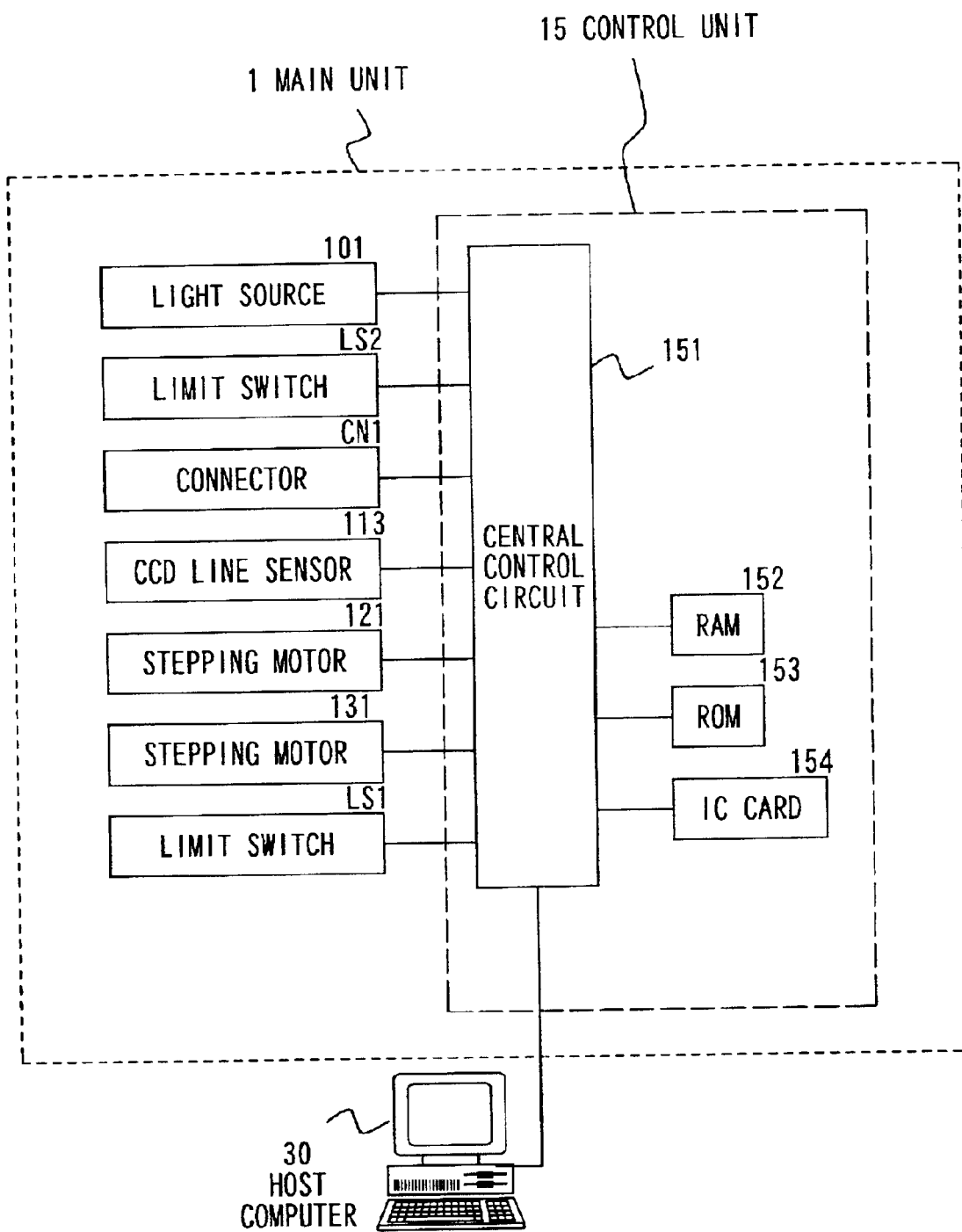
FIG. 13 is a block diagram illustrating the electrical structure of the main unit of the image reading device.

FIG. 13 is a block diagram illustrating the connection between the main unit 1 of the image reading device and the host computer 30. As a comparison of FIG. 13 and FIG. 5 clearly indicates, the host computer 30 is connected to the main unit 1 of the image reading device. In the embodiment explained below, the present invention is adopted in an image reading device having a function of correcting adverse effects of defects such as dust, scratches and fingerprints present on the film original by utilizing infrared (IR) light emitted by the light source 101 of the illumination unit 10 shown in FIG. 1.

In this application, an execution of accurate autofocusing is enabled by using infrared light (IR) emitted by the light source 101. In addition, adverse effects of defects such as dust, scratches and fingerprints present on the film original can be corrected during the execution of a main scan by using infrared light (IR) emitted by the light source 101, making it possible to read an image with a high image quality. The infrared light (IR) emitted by the light source 101 can be utilized for both purposes and, thus, it is not necessary to provide a separate infrared light (IR) for each purpose.

Figure 14:
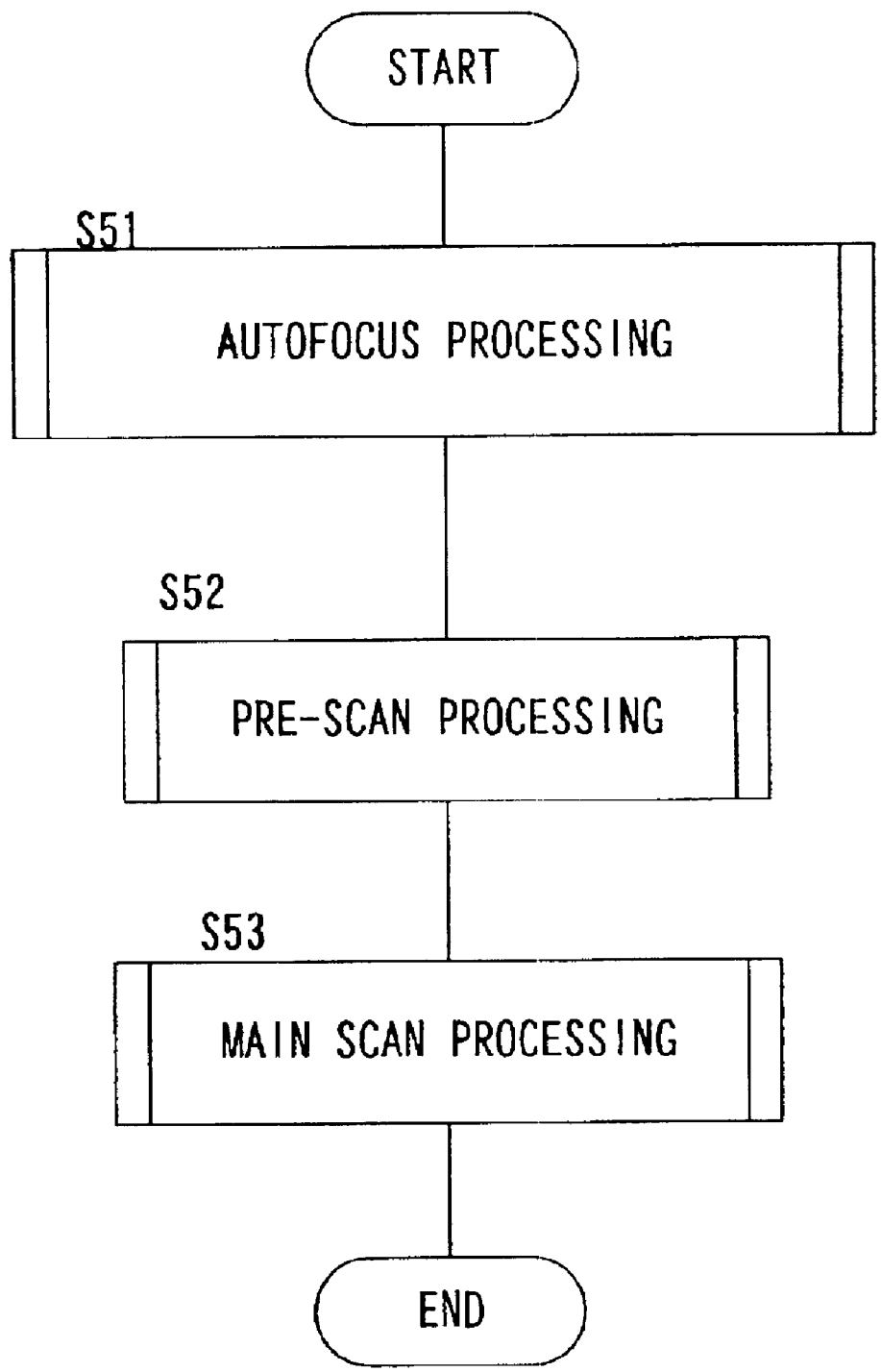
FIG. 14 presents a flowchart of the overall processing implemented when the image reading device engages in an image read.

FIG. 14 is a flow chart of the overall processing implemented when the image reading device engages in an image read. In FIG. 14, the autofocus processing in step S51 is the equivalent to that shown in the flow chart (subroutine) in FIG. 6 or FIG. 12 explained earlier. Namely, as shown in FIG. 14, after executing the autofocus processing in step S51, the image reading device executes pre-scan processing in step S52 and then executes the main scan processing in step S53. In the embodiment, after executing an autofocusing operation by using infrared light (IR), processing for eliminating the adverse effects of defects such as dust, scratches and fingerprints from the image data is implemented by using infrared light (IR) during the pre-scan processing (step S52) and the main scan processing (step S53). It is to be noted that the pre-scan processing and the main scan processing are to be explained later (see FIG. 29).

The principle of the embodiment: with respect to the image data correction processing is now explained in reference to FIG. 15 and FIGS. 16A–16D. An image on a film original may be read through a line sequential method in which the read for each line is executed by switching among four colors or through a plane sequential method in which the entire image plane is read in one color, then the entire image plane is read in a different color until the image plane has been read in all four colors. In either method, data in four colors, R (red), G (green) and B (blue) and IR (infrared) are stored in the RAM 152 in FIG. 13.

The following differences exist among the data corresponding to the four colors. The data for the individual colors, R (red), G (green) and B (blue), which are all visible data, correspond to the red (R) component, the green (G) component and the blue (B) component: of the film original respectively. In other words, the individual types of data corresponding to red (R), green (G) and blue (B) indicate density information with respect to the film original. Since the illuminating light is deflected by any dust or scratch present on the film original and the quantity of light reaching a line sensor 113 is reduced, the data corresponding to the area where the dust or the scratch is present indicate a dark state (a dense state) in the film original. Thus, in each type of data corresponding to red (R), green (G) or blue (B), "information on light blocked by dust, scratch or the like" is superimposed on the "information on the inherent density of the film original."

Since a film original does not normally manifest a photosensitivity in infrared light (IR), any change in the density occurring on the film original does not manifest in the image data obtained under infrared light (IR). Consequently, when illumination is achieved by using infrared light (IR), the illuminating light is transmitted through the film original almost unimpeded, and the line data obtained under infrared light (IR) indicate essentially a constant value regardless of the type of film original. Accordingly, the transmittance of the infrared light (IR) may be ascertained by detecting the transmitted light when there is not defect, or it may be stored in memory in advance if it is already known. However, if there is dust, a scratch or the like on the film original, the illuminating light is deflected by the dust, scratch or the like and does not reach the CCD line sensor 113. In other words, data attenuated by dust, a scratch or the like manifest as the line data obtained under infrared (IR) light.

In short, when the film original is illuminated with illuminating light in four different colors, i.e., red (R), green (G), blue (B) and infrared (IR), the line data obtained under illuminating light in red (R), green (G) and blue (B) contain the "information on light blocked by dust, a scratch or the like" superimposed on the "information on the inherent density of the film original" which corresponds to information obtained in the prior art. In addition, in the line data obtained under infrared (IR) illuminating light, data indicating an attenuated value reflect the "information on light blocked by dust, a scratch or the like."

In FIG. 15, if there is no defect on the film original, the transmission level of infrared light (IR) indicates a specific constant value (maximum value) and, at the same time, the transmission levels of red (R), green (G) and blue (B) indicate values corresponding to the original density. If there is a defect on the film original, the transmission levels each become attenuated at the position where the defect is present, and since the level of the infrared light (IR') at the defective spot indicates a value resulting from the attenuation relative to the maximum value corresponding to a state in which there is no defect, the ratio of the two values, i.e., (IR'/IR) indicates the rate of attenuation occurring at the defective spot.

By detecting the transmission level (IR') which is attenuated relative to the largest value (IR) of the transmission level when detecting the transmission level of the infrared light on the film original 60, the ratio of the two levels (IR/IR') can be ascertained and, thus, the correction value for the individual color levels can be calculated. In other words, by multiplying the attenuated red color level (R'), green color level (G') and blue color level (B') individually by (IR/IR'), they can be corrected to a red color level (R), a green color level (G) and a blue color level (B) in a defect-free state.

Figure 16A:
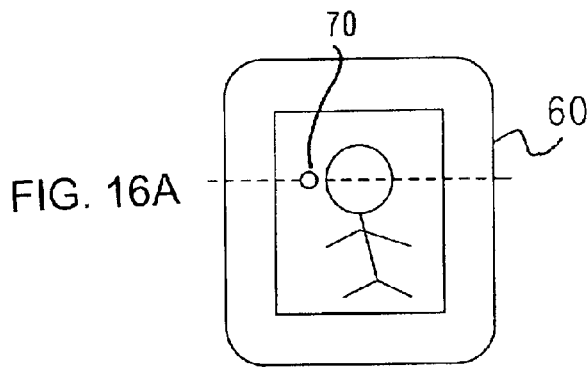
FIG. 16 illustrates the correction operation performed on image data.
Figure 16B:
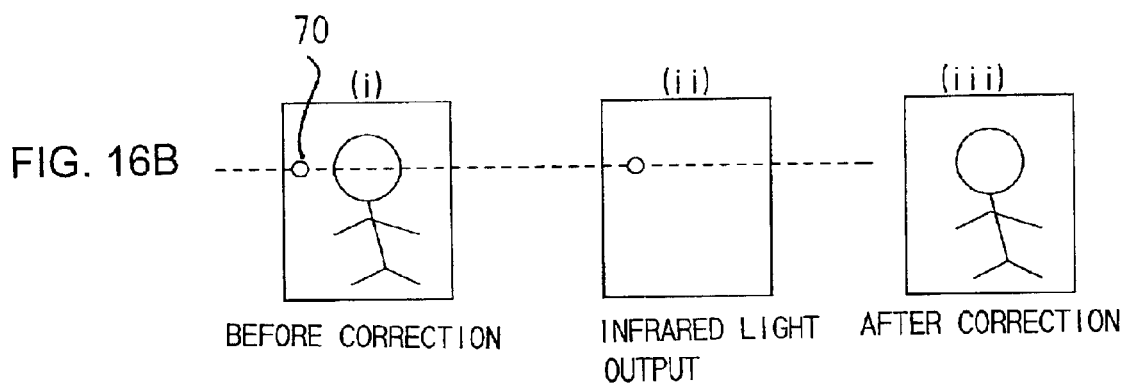
Figure 16C:
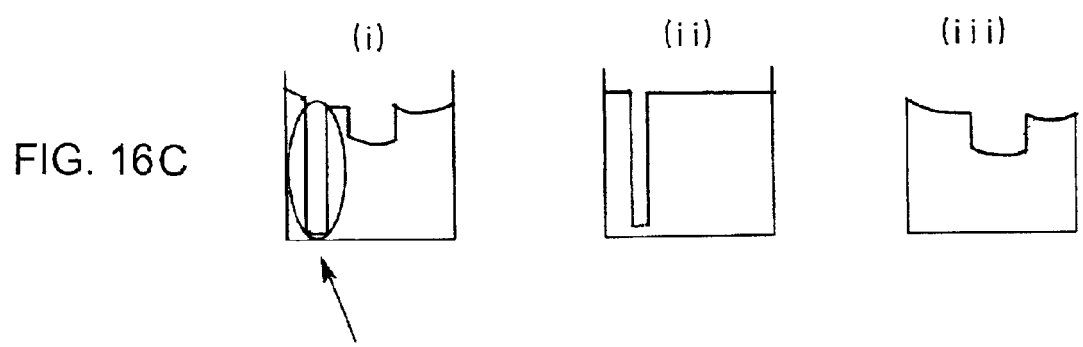
Figure 16D:
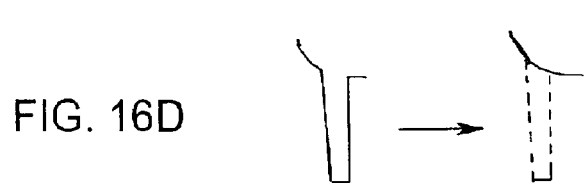

For instance, if dust 70 is adhering to the film original 60 as illustrated in FIG. 16A, the image plane obtained under the illuminating light in the three colors, red (R), green (G) and blue (B), shows the dust 70 as well as the image of a person as shown in FIG. 16B(i). The corresponding line data include the data of the image of the person and the data corresponding to the area where the dust 70 is adhering, as indicated by the arrow in FIG. 16C(i). The image plane obtained under the infrared (IR) illuminating light, on the other hand, shows a dark spot corresponding to the dust 70, as shown in FIG. 16B(ii). In the corresponding line data, the data representing the spot where the dust 70 is adhering are attenuated, as illustrated in FIG. 16C(ii).

Thus, based upon the line data obtained under the infrared (IR) illuminating light, the presence/absence of the dust 70 can be determined, and if the presence of the dust 70 is detected, the position at which the dust 70 is present on the film original can be identified. Information attributable to the presence of the dust 70 (indicated by the arrow in FIG. 16C(i)) is also present in the data obtained under the illuminating light in red (R), green (G) and blue (B) at this identified position on the film original. Accordingly, by multiplying the data corresponding to the same position obtained under the illuminating light in red (R), green (G) and blue (B) by the ratio (IR/IR'), the data can be corrected so as to negate the presence of the dust 70 (see FIG. 16B(iii) and FIG. 16C(iii)).

However, this correction processing is naturally only effective when the individual types of data corresponding to red (R), green (G) and blue (B) attenuated due to a defect include information corresponding to a defect-free state. In other words, if the level of IR'required to ascertain the ratio (IR/IR') is too low, the data obtained under the illuminating light in R, G and B cannot be corrected. It is assumed that the data cannot be corrected simply by multiplying them by the ratio (IR/IR') if the level of IR' is lower than a predetermined threshold value.

In such a case, a correction may be performed through interpolation processing described below. In general, the area occupied by the spot where dust, a scratch or the like is present is relatively small, and thus, the density on the initial film original 60 is less likely to vary within this area occupied by the defective spot (i.e., the presence of a pattern is unlikely within the area) and rather, the image character within the area is likely to be consistent. Accordingly, the data at the spot identified to have dust, a scratch or the like may be corrected by using data corresponding to adjacent areas on both sides and connecting the data smoothly (see FIG. 16D) to achieve a natural image that does not look different from the image on the film original 60 (see FIG. 16B(iii)).

Figure 29:
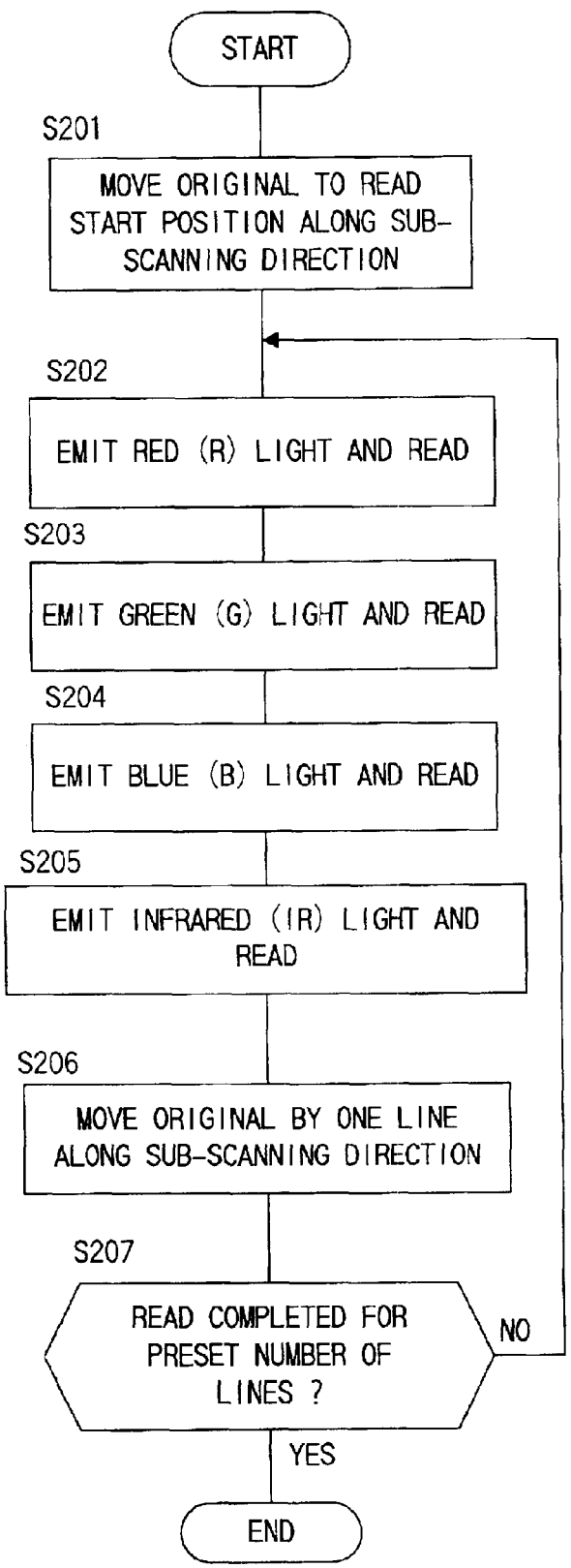
FIG. 29 presents a flowchart of the processing for a pre-scan and a main scan.

Since the correction operation described above is achieved jointly by the host computer 30 and the main unit 1 of the image reading device, the processing operation performed by the host computer 30 and the processing operation performed by the main unit 1 of the image reading device are separately explained below. First, the correction processing operation implemented by the host computer 30 is explained (FIGS. 17–24) and then a brief explanation is given on the read operation performed in the image reading device (FIGS. 14 and 29).

(A) Processing Operation by Host Computer 30

In FIGS. 17–24, the host computer 30 transmits a pre-scan start instruction to the image reading device main unit 1 in response to a clicking operation on the scan button in the menu screen performed by the user in step S101. Upon receiving the instruction, the image reading device main unit 1 performs a pre-scan (see FIG. 29) which is to be detailed later, and then transmits pre-scan image data to the host computer 30. The pre-scan image data are constituted of red color (R) data, green color (G) data, blue color (B) and infrared (IR) data.

In step S102, the host computer 30 waits for the entire pre-scan image data transmitted by the image reading device main unit 1 to be received. When the pre-scan image data are received in their entirety, the host computer 30 makes an affirmative decision (YES) before proceeding to step S103.

In step S103, the host computer 30 detects the maximum value Rmax in the red color (R) data, the maximum value Gmax in the green color (G) data and the maximum value Bmax in the blue color (B) data in the pre-scan image data that have been received. Then, in the following step S104, the host computer 30 makes a decision as to whether or not the film that has been set is positive film.

If the film that has been set is positive film, the host computer 30 first makes an affirmative decision (YES) in step S104, implements the processing in steps S105–S109 and then executes the processing in steps as S116–S184. If, on the other hand, the film is negative film, the host computer 30 makes a negative decision (NO) in step S104, implements the processing in steps S110–S115 and then executes the processing in steps S116–S184.

Through the processing in steps S105–S109 and the processing in steps S110–S115, the lengths of storage time for the main scan are set.

(1) When Positive Film has Been Set

In step S105, the host computer 30 sets the largest value among Rmax, Gmax and Bmax ascertained in step S103 as a visible light max. In step S106, the host computer 30 calculates an RGB magnification in order to set the visible light max near the full scale of the A/D converter 19. Namely, since the full scale value is 255 when the A/D converter 19 handles 8-bit data, the host computer 30 engages in calculation of; RGB magnification=255/visible light max.

In step S107, the host computer 30 detects the maximum value IRmax of the infrared (IR) data in the pre-scan image data that have been received. In step S108, it calculates an IR magnification in order to set IRmax near the full scale of the A/D converter 19. Namely, it engages in calculation of; IR magnification=255/IRmax if the A/D converter 19 handles 8-bit data.

In step S109, the host computer 30 sets lengths of storage time for the main scan, Tr, Tg, Tb and Tir calculated by multiplying the lengths of storage time for the pre-scan Tr', Tg', Tb' and Tir' by the magnification. In other words, the host computer 30 calculates Tr=Tr'×RGB magnification, Tg=Tg'×RGB magnification, Tb=Tb'×RGB magnification and Tir=Tir'×IR magnification in step S109 before proceeding to step S116.

(2) When Negative Film has Been Set

In this case, in order to individually set Rmax, Gmax and Bmax ascertained in step S103 near the full scale of the A/D converter 19, individual magnifications are calculated.

In step S110, the host computer 30 calculates an R magnification=255/Rmax by using Rmax ascertained in step S103. In step S111, the host computer 30 calculates a G magnification=255/Gmax by using Gmax ascertained in step S103. In step S112, the host computer 30 calculates a B magnification=255/Bmax by using Bmax ascertained in step S103.

In step S113, the host computer 30 detects the maximum value IRmax in the infrared (IR) data in the pre-scan image data that have been received. In step S114, in order to set IRmax near the full scale of the A/D converter 19, an IR magnification is calculated. Namely, IR magnification=255/IRmax is calculated before the operation proceeds to step S115.

In step S115, the host computer 30 sets lengths of storage time for the main scan, Tr, Tg, Tb and Tir calculated by multiplying the lengths of storage time for the pre-scan Tr', Tg', Tb' and Tir' by the magnifications. In other words, the host computer 30 calculates Tr=Tr'×R magnification, Tg =Tg'×G magnification, Tb=Tb'×B magnification and Tir= Tir'×IR magnification in step S115 before proceeding to step S116.

In step S116, the host computer 30 transmits data indicating the lengths of storage time Tr, Tg, Tb and Tir obtained through the procedure described above and a main scan start instruction to the image reading device main unit 1. In response, the image reading device main unit 1 engages in a read of the main scan image data through a planar sequential method or a linear sequential method. An explanation of the planar sequential method and the linear sequential method is omitted here. In the following step S117, the host computer 30 waits for the main scan image data to be transmitted from the image reading device main unit 1.

Upon completing the reception of the main scan image data transmitted from the image reading device main unit 1, the host computer 30 makes an affirmative decision (YES) in step S117 and then proceeds to step S118. In step S118, it selects the pixels in an mth block among all the pixels corresponding to the IR data. The host computer 30 makes a decision in step S119 as to whether or not there is any pixel indicating a brightness level lower than a first IR brightness level in the selected mth block of the IR data. In other words, the host computer 30 makes a decision as to whether or not there is a defect present in the selected mth block in step S119. The first IR brightness level represents, a transmittance level achieved when there is no defect in the film original 60. When positive film has been set, the first IR brightness level is represented by a value obtained by multiplying IRmax ascertained in step S107 by the IR magnification ascertained in step S108. If, on the other hand, negative film has been set, the first IR brightness level is represented by a value obtained by multiplying IRmax ascertained in step S113 by the IR magnification obtained in step S114.

If an affirmative decision (YES) is made in step S119, i.e., if there is a defect in the selected mth block, the host computer 30 engages in processing for specifying and adjusting the defective position in the corresponding mth block of the R data in steps S120–S137. An example of a processing method that may be adopted for this purpose is explained in reference to FIGS. 25–28.

FIG. 25A shows a block in which a defect is detected with respect to the IR level in step S119. In FIG. 25A, the brightness level "255" represents the first IR brightness level explained in reference to the processing in step S119, and the pixels indicating brightness levels lower than 255 are indicated in shading. FIG. 25B, which shows the visible light block corresponding to the block in FIG. 25A, illustrates a situation in which there is a defect with respect to the visible light level. FIG. 25C, on the other hand, shows the visible light level achieved when there is no defect present in the corresponding block.

In step S120, the host computer 30 selects one block among the blocks offset within the range of ±3 pixels relative to the mth block of the R data corresponding to the selected mth block of the IR data. FIGS. 26–28 present the results of the calculation performed by using the blocks offset from the target 3×3 pixels along the vertical and horizontal directions by one pixel.

In step S121, the host computer 30 obtains a difference (subtraction value) (R)n by executing a calculation; "brightness value indicated by R data in selected nth block"–"IR data brightness value in mth block." The nth block refers to, for instance, the block in FIG. 25B corresponding to the 3×3 pixel block enclosed with the bold line in FIG. 26A1. Thus, the differences "−55," "−55" and "80" in the first row of the 3×3 pixels enclosed by the bold frame in FIG. 26A1 are respectively calculated through "−55=200−255," "−55= 200−255" and "80=200−120."

In step S122, the host computer 30 calculates the total of the absolute values of the differences thus obtained. To explain this process by using the results of the subtraction performed for the 3×3 pixels enclosed by the bold frame in FIG. 26A1, the subtotal for the first row is "190," the subtotal for the second row is "310" and the subtotal for the third row is "451" with the sum total amounting to "951." A similar calculation is performed for FIGS. 26A2 and A3, FIGS. 27B1, B2 and B3 and FIGS. 28C1, C2 and C3.

In step S123, the host computer 30 records the total value (R)n ascertained at a single position as described above in the memory (not shown). In step S124, the host computer 30 makes a decision as to whether or not the operation for calculating the sum total of the absolute values of the differences by offsetting the target 3×3 pixels by one pixel along the vertical direction and the horizontal direction has been performed 49 times. If a negative decision (NO) is made, the operation returns to step S120. In other words, until an affirmative decision (YES) is made in step S124, the host computer 30 repeats the operation performed in step S124→S120→S121→S122→S123→S124. When the host computer 30 makes an affirmative decision (YES) in step S124, the operation proceeds to step S125. In step S125, the smallest total value (R)n.min among the calculated total values (R)n is selected. In the example presented in FIGS. 25–28, FIG. 27B2 with the total value of "630" is selected in this step.

In step S126, the host computer 30 identifies the block corresponding to the total value (R)n.min (FIG. 27B2) as the block corresponding to the mth block of the IR data (see FIG. 25A). In step S127, the host computer 30 selects one pixel in the mth block (see FIG. 25A) of the IR data. In step S128, the host computer 30 makes a decision as to whether or not the brightness level indicated by the selected IR pixel is lower than the first IR brightness level.

If a negative decision (NO) is made in step S128, the host computer 30 proceeds to step S133 to record the brightness level indicated by the corresponding R pixel in the memory (not shown) before proceeding to step S136. If, on the other hand, an affirmative decision (YES) is made in step S128, the host computer 30 proceeds to step S129 to make a decision as to whether or not the brightness level indicated by the selected IR pixel is equal to or higher than a second IR brightness level.

If the brightness level indicated by the selected IR pixel is equal to or higher than the second IR brightness level, the host computer 30 makes an affirmative decision (YES) in step S129 and proceeds to step S130. In step S130, a correction coefficient is obtained by calculating; (maximum IR brightness)/(IR pixel brightness) and then the operation proceeds to step S136 via steps S131 and S132. In step S131, the host computer 30 engages in calculation of; corrected R data brightness level=(corresponding R pixel brightness level)×(correction coefficient). In step S132, the host computer 30 records the corrected R data brightness level ascertained in step S131 in the memory (not shown).

If, on the other hand, a negative decision (NO) is made in step S129, i.e., if the brightness level of the selected IR pixel is lower than the second IR brightness level, the host computer 30 proceeds to step S134. In step S134, the host computer 30 calculates the corresponding R pixel brightness level based upon a nearby R brightness level. Then, in step S135, the host computer 30 records the calculated R pixel brightness level in the memory (not shown) before proceeding to step S136.

In step S136, the host computer 30 makes a decision as to whether or not the processing has been completed for all the pixels in the mth block. If a negative decision (NO) is made in step S136, the operation returns to step S127 to implement similar processing for the next pixel. If, on the other hand, an affirmative decision (YES) is made in step S136, the operation proceeds to step S137 in which the host computer 30 makes a decision as to whether or not the processing for all the blocks has been completed with regard to the R data.

If a negative decision (NO) is made in step S137, the operation returns to step S118 in which the host computer 30 selects another block to engage in similar processing for the R data. If, on the other hand, an affirmative decision (YES) is made in step S137, the host computer 30 executes similar processing for the G data and the B data. The processing of the G data is implemented in steps S138–S157, whereas the processing of the B data is implemented in steps S158–S177. The following is a step-by-step explanation of the processing given in this order.

In step S138, the pixels in the mth block among all the pixels corresponding to the IR data are selected. The host computer 30 makes a decision in step S139 as to whether or not there is any pixel indicating a brightness level lower than the first IR brightness level in the selected mth block of the IR data. In other words, the host computer 30 makes a decision as to whether or not there is a defect present in the selected mth block in step S139. The first IR brightness level represents a transmittance level achieved when there is no defect in the film original 60 and IRmax ascertained in step S107 or S113 may be used as the first IR brightness level.

If an affirmative decision (YES) is made in step S139, i.e., if there is a defect in the selected mth block, the host computer 30 engages in processing for specifying and adjusting the defective position in the corresponding mth block of the G data in steps S140–S157. An example of a processing method that may be adopted for this purpose is explained in reference to FIGS. 25–28.

FIG. 25A shows a block in which a defect is detected with respect to the IR transmittance level in step S139. In FIG. 25A, the brightness level "255" represents the first IR brightness level as referred to in the explanation of the processing in step S139, and the pixels indicating brightness levels lower than 255 are indicated in shading. FIG. 25B, which shows the visible light block corresponding to the block in FIG. 25A, illustrates a situation in which there is a defect with respect to the visible light level. FIG. 25C, on the other hand, shows the visible light level achieved when there is no defect present in the corresponding block.

In step S140, the host computer 30 selects one block among the blocks offset within the range of ±3 pixels relative to the mth block of the G data corresponding to the selected mth block of the IR data. FIGS. 26–28 present the results of the calculation performed by using the blocks offset from the target 3×3 pixels along the vertical and horizontal directions by one pixel.

In step S141, the host computer 30 obtains a difference G(n) by executing a calculation; "brightness value indicated by G data in selected nth block"–"IR data brightness value in mth block." The nth block refers to, for instance, the block in FIG. 25B corresponding to the 3×3 pixel block enclosed with the bold line in FIG. 26A1. Thus, the differences "–55," "–55" and "80" in the first row of the 3×3 pixels enclosed by the bold frame in FIG. 26A1 are respectively calculated through "–55=200–255," "–55=200–255" and "80=200–120–120."

In step S142, the host computer 30 calculates the total of the absolute values of the differences thus obtained. To explain this process by using the results of the subtraction performed for the 3×3 pixels enclosed by the bold frame in FIG. 26A1, the subtotal for the first row is "190," the subtotal for the second row is "310" and the subtotal for the third row is "451" with the sum total amounting to "951." A similar calculation is performed for FIGS. 26A2 and A3, FIGS. 27B1, B2 and B3 and FIGS. 28C1, C2 and C3.

In step S143, the host computer 30 records the total value (G)n ascertained at a single position as described above in the memory (not shown). In step S144, the host computer 30 makes a decision as to whether or not the operation for calculating the sum total of the absolute values of the differences by offsetting the target 3×3 pixels by one pixel along the vertical direction and the horizontal direction has been performed 49 times. If a negative decision (NO) is made, the operation returns to step S140. In other words, until an affirmative decision (YES) is made in step S144, the host computer 30 repeats the operation performed in step S144→S140→S141→S142→S143→S144. When the host computer 30 makes an affirmative decision (YES) in step S144, the operation proceeds to step S145. In step S145, the smallest total value (G)n.min among the calculated total values (G)n is selected. In the example presented in FIGS. 25–28, FIG. 27B2 with the total value of "630" is selected in this step.

In step S146, the host computer 30 identifies the block corresponding to the total value (G)n.min (FIG. 27B2) as the block corresponding to the mth block of the IR data (see FIG. 25A). In step S147, the host computer 30 selects one pixel in the mth block (see FIG. 25A) of the IR data. In step S148, the host computer 30 makes a decision as to whether or not the brightness level indicated by the selected IR pixel is lower than the first IR brightness level.

If a negative decision (NO) is made in step S148, the host computer 30 proceeds to step S153 to record the brightness level indicated by the corresponding G pixel in the memory (not shown) before proceeding to step S156. If, on the other hand, an affirmative decision (YES) is made in step S148, the host computer 30 proceeds to step S149 to make a decision as to whether or not the brightness level indicated by the selected IR pixel is equal to or higher than a second IR brightness level.

If the brightness level indicated by the selected IR pixel is equal to or higher than the second IR brightness level, the host computer 30 makes an affirmative decision (YES) in step S149 and proceeds to step S150. In step S150, a correction coefficient is obtained by calculating; (maximum IR brightness)/(IR pixel brightness) and then the operation proceeds to step S156 via steps S151 and S152. In step S151, the host computer 30 engages in calculation of; corrected G data brightness level=(corresponding G pixel brightness level)×(correction coefficient). In step S152, the host computer 30 records the corrected G data brightness level ascertained in step S151 in the memory (not shown).

If, on the other hand, a negative decision (NO) is made in step S149, i.e., if the brightness level of the selected IR pixel is lower than the second IR brightness level, the host computer 30 proceeds to step S154. In step S154, the host computer 30 calculates the corresponding G pixel brightness level based upon a nearby G brightness level. Then, in step S155, the host computer 30 records the calculated G pixel brightness level in the memory (not shown) before proceeding to step S156.

In step S156, the host computer 30 makes a decision as to whether or not the processing has been completed for all the pixels in the mth block. If a negative decision (NO) is made in step S156, the operation returns to step S147 to implement similar processing for the next pixel. If, on the other hand, an affirmative decision (YES) is made in step S156, the operation proceeds to step S157 in which the host computer 30 makes a decision as to whether or not the processing for all the blocks has been completed with regard to the G data.

If a negative decision (NO) is made in step S157, the operation returns to step S138 in which the host computer 30 selects another block to engage in similar processing for the G data. If, on the other hand, an affirmative decision (YES) is made in step S157, the host computer 30 executes similar processing for the B data (S158–S177).

In step S158, it selects the pixels in the mth block among all the pixels corresponding to the IR data. The host computer 30 makes a decision in step S159 as to whether or not there is any pixel indicating a brightness level lower than the first IR brightness level in the selected mth block of the IR data. In other words, the host computer 30 makes a decision as to whether or not there is a defect present in the selected mth block in step S159. The first IR brightness level represents a transmittance level achieved when there is no defect in the film original 60 and IRmax ascertained in step S107 or S113 may be used as the first IR brightness level.

If an affirmative decision (YES) is made in step S159, i.e., if there is a defect in the selected mth block, the host computer 30 engages in processing for specifying and adjusting the defective position in the corresponding mth block of the B data in steps S160–S177. An example of a processing method that may be adopted for this purpose is explained in reference to FIGS. 25–28.

FIG. 25A shows a block in which a defect is detected with respect to the IR transmittance level in step S159. In FIG. 25A, the brightness level "255" represents the first IR brightness level as referred to in the explanation of the processing in step S159 and the pixels indicating brightness levels lower than 255 are indicated in shading. FIG. 25B, which shows the visible light block corresponding to the block in FIG. 25A, illustrates a situation in which there is a defect with respect to the visible light level. FIG. 25C, on the other hand, shows the visible light level achieved when there is no defect present in the corresponding block.

In step S160, the host computer 30 selects one block among the blocks offset within the range of ±3 pixels relative to the mth block of the B data corresponding to the selected mth block of the IR data. FIGS. 26–28 present the results of the calculation performed by using the blocks offset from the target 3×3 pixels along the vertical and horizontal directions by one pixel.

In step S161, the host computer 30 obtains a difference B(n) by executing a calculation; "brightness value indicated by B data in selected nth block"–"IR data brightness value in mth block." The nth block refers to, for instance, the block in FIG. 25B corresponding to the 3×3 pixel block enclosed with the bold line in FIG. 26A1. Thus, the differences "–55," "–55" and "80" in the first row of the 3×3 pixels enclosed by the bold frame in FIG. 26A1 are respectively calculated through "–55=200–255," "–55=200–255" and "80=200–120."

In step S162, the host computer 30 calculates the total of the absolute values of the differences thus obtained. To explain this process by using the results of the subtraction performed for the 3×3 pixels enclosed by the bold frame in FIG. 26A1, the subtotal for the first row is "190," the subtotal for the second row is "310" and the subtotal for the third row is "451" with the sum total amounting to "951." A similar calculation is performed for FIGS. 26A2 and A3, FIGS. 27B1, B2 and B3 and FIGS. 28C1, C2 and C3.

In step S163, the host computer 30 records the total value (B)n ascertained at a single position as described above in the memory (not shown). In step S164, the host computer 30 makes a decision as to whether or not the operation for calculating the sum total of the absolute values of the differences by offsetting the target 3×3 pixels by one pixel along the vertical direction and the horizontal direction has been performed 49 times. If a negative decision (NO) is made, the operation returns to step S160. In other words, until an affirmative decision (YES) is made in step S164, the host computer 30 repeats the operation performed in step S164→S160→S161→S162→S163→S164. When the host computer 30 makes an affirmative decision (YES) in step S164, the operation proceeds to step S165. In step S165, the smallest total value (B)n.min among the calculated total values (B)n is selected. In the example presented in FIGS. 25–28, FIG. 27B2 with the total value of "630" is selected in this step.

In step S166, the host computer 30 identifies the block corresponding to the total value (B)n.min (FIG. 27B2) as the block corresponding to the mth block of the IR data (see FIG. 25A). In step S167, the host computer 30 selects one pixel in the mth block (see FIG. 25A) of the IR data. In step S168, the host computer 30 makes a decision as to whether or not the brightness level indicated by the selected IR pixel is lower than the first IR brightness level.

If a negative decision (NO) is made in step S168, the host computer 30 proceeds to step S173 to record the brightness level indicated by the corresponding B pixel in the memory (not shown) before proceeding to step S176. If, on the other hand, an affirmative decision (YES) is made in step S168, the host computer 30 proceeds to step S169 to make a decision as to whether or not the brightness level indicated by the selected IR pixel is equal to or higher than the second IR brightness level.

If the brightness level indicated by the selected IR pixel is equal to or higher than the second IR brightness level, the host computer 30 makes an affirmative decision (YES) in step S169 and proceeds to step S170. In step S170, a correction coefficient is obtained by calculating; (maximum IR brightness)/(IR pixel brightness) and then the operation proceeds to step S176 via steps S171 and S172. In step S171, the host computer 30 engages in calculation of; corrected B data brightness level=(corresponding B pixel brightness level)×(correction coefficient). In step S172, the host computer 30 records the corrected B data brightness level ascertained in step S171 in the memory (not shown).

If, on the other hand, a negative decision (NO) is made in step S169, i.e., if the brightness level of the selected IR pixel is lower than the second IR brightness level, the host computer 30 proceeds to step S174. In step S174, the host computer 30 calculates the corresponding B pixel brightness level based upon a nearby B brightness level. Then, in step S175, the host computer 30 records the calculated B pixel brightness level in the memory (not shown) before proceeding to step S176.

In step S176, the host computer 30 makes a decision as to whether or not the processing has been completed for all the pixels in the mth block. If a negative decision (NO) is made in step S176, the operation returns to step S167 to implement similar processing for the next pixel. If, on the other hand, an affirmative decision (YES) is made in step S176, the operation proceeds to step S177 in which the host computer 30 makes a decision as to whether or not the processing for all the blocks has been completed with regard to the B data.

If a negative decision (NO) is made in step S177, the operation returns to step S158 in which the host computer 30 selects another block to engage in similar processing. If, on the other hand, an affirmative decision (YES) is made in step S177, the operation proceeds to step S178 to make a decision as to whether or not the film that has been set is positive film.

If an affirmative decision (YES) is made in step S178, the operation proceeds to step S179 in which the host computer 30 makes a decision as to whether or not the gradation conversion has been set by the user. If an affirmative decision (YES) is made in step S179, the host computer engages in gradation conversion processing on the R, G and B data in step S180. Then, the host computer 30 outputs the image data having undergone the correction processing to be displayed on the display in step S181.

If, on the other hand, a negative decision (NO) is made in step S178, the operation proceeds to step S182 in which the host computer makes a decision as to whether or not gradation conversion has been set by the user. If an affirmative decision (YES) is made in step S182, the host computer 30 merges the gradation conversion function to the gradation inversion function in step S183 before proceeding to step S180. If, on the other hand, a negative decision (NO) is made in step S182, the host computer 30 sets the gradation inversion function as the setting gradation conversion function in step S184 before proceeding to step S180.

It is to be noted that an explanation has been given in reference to this embodiment on an example in which the host computer 30, upon detecting a defect in step S119, immediately performs alignment. However, depending upon the characteristics of the optical system, the infrared light (IR) image formation position and the visible light image formation position may not always be in complete alignment and, in such a case, a focal misalignment occurs which often manifests in a larger IR image formed compared to the visible light image. Accordingly, it is necessary to match their image sizes before implementing the alignment during the correction operation. The sizes may be matched through a method in which the image formation positions are adjusted during the read at the image reading device main unit 1 or through Fourier analysis.

The sizes are matched by taking the following procedural steps (1)–(6) in Fourier analysis;
(1) The frequency distribution at the defective infrared component level is ascertained by implementing a Fourier transform on the defective infrared level.
(2) The frequency distribution at the defective visible component level is ascertained by implementing a Fourier transform on the defective visible light level.
(3) The defective infrared frequency representing the frequency at the defective infrared component level is detected based upon the frequency distribution at the defective infrared component level.
(4) A defective visible frequency which is close to the defective infrared frequency above is detected based upon the frequency distribution at the defective visible component level.
(5) The defective infrared frequency is shifted closer to the defective visible frequency.
(6) An inverse Fourier transform is implemented on the shifted defective infrared frequency.

It is desirable to implement the gradation conversion after the defect correction processing as in this embodiment for the following reason. If the gradation conversion was executed first, the defect correction processing would need to be performed by taking into consideration the results of the gradation conversion processing, which would complicate the process of defect correction. In other words, the method adopted in the embodiment achieves an advantage of simplifying the processing.

The procedure shown in FIGS. 17–24 is stored in the memory (not shown) and is also stored in a CD-ROM in a setup-ready state.

(B) Processing Operation by the Image Reading Device Main Unit

As explained in reference to FIG. 14, the image reading device main unit 1 executes autofocus processing (S51), pre-scan processing (S52) and main scan processing (S53). The following is a brief explanation of the pre-scan processing and the main scan processing. It is to be noted that the flow chart used in the explanation represents an example in which the linear sequential read method is adopted.

FIG. 29 is a schematic flow chart of the pre-scan processing and the main scan processing. This flow chart starts when the image reading device main unit 1 receives a pre-scan instruction or a main scan instruction from the host computer 30.

In step S201, the CPU within the central control unit 151 of the image reading device main unit 1 drives the stepping motor 121 to move the frames in the strip film 23 (or the original holding stage on which the film original 60 is placed) along the sub-scanning direction (see FIGS. 4 and 5). Thus, the position relative to the optical system is set at a predetermined initial position.

In step S202, the CPU in the central control unit 151 causes red (R) light to be emitted from the light source 101 and reads R image data corresponding to one line. In step S203, the CPU in the central control unit 151 causes green (G) light to be emitted from the light source 101 and reads G image data corresponding to one line. In step S204, the CPU in the central control unit 151 causes blue (B) light to be emitted from the light source 101 and reads B image data corresponding to one line.

In step S205, the CPU in the central control unit 151 causes infrared (IR) light to be emitted from the light source 101 and reads IR image data corresponding to one line. In step S206, the CPU in the central control unit 151 drives the stepping motor 121 to move the frames of the strip film 23 (or the original holding stage on which the film original 60 is placed) by one line along the sub scanning direction.

In step S207, the CPU in the central control unit 151 makes a decision as to whether or not a read of a preset number of lines has been completed. The number of lines is set by the host computer 30. If the read of the preset number of lines has not been completed yet, the operation returns to step S202 to execute a read of one line. If, on the other hand, the preset number of lines has been read, the processing ends.

Figure 17:
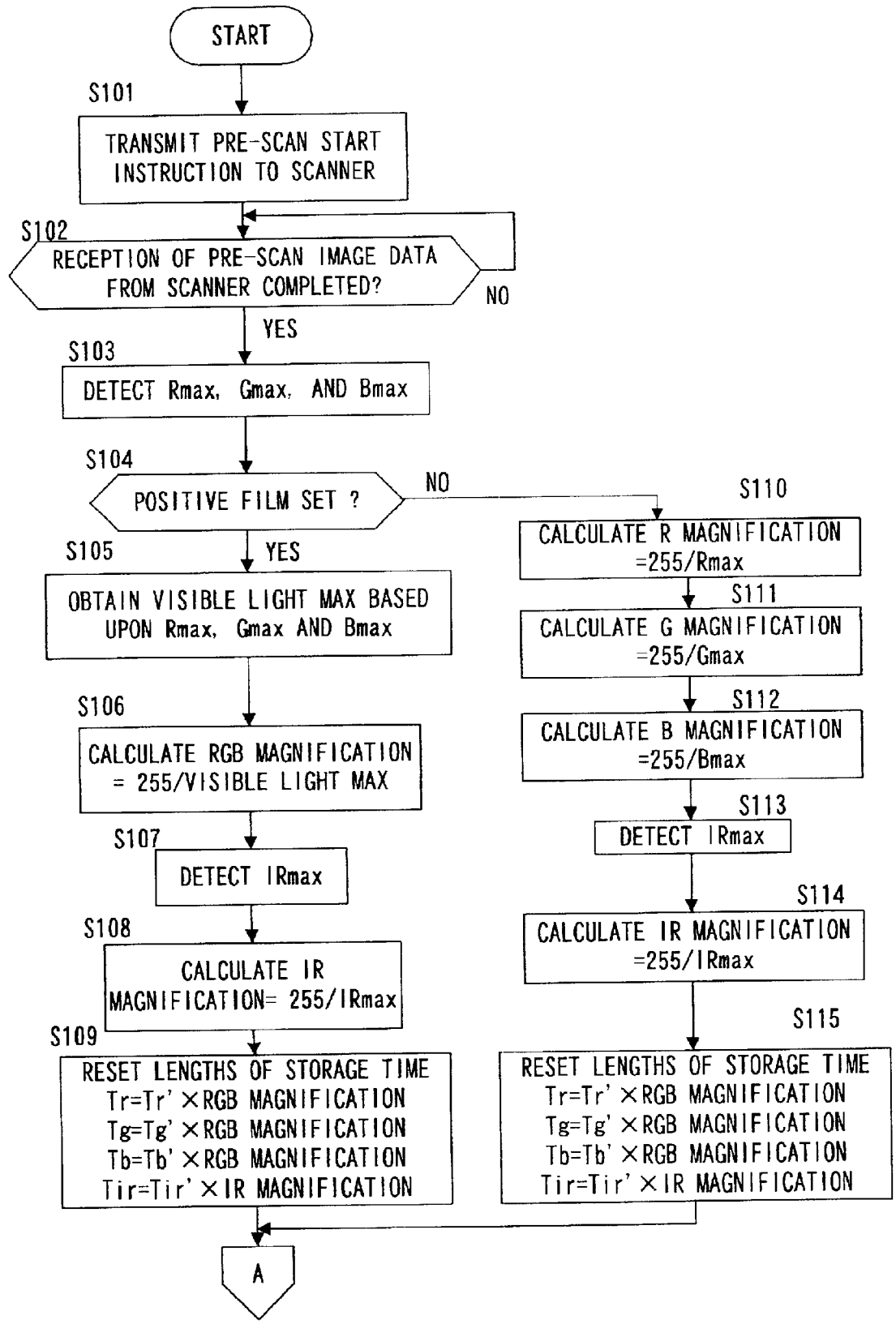
FIG. 17 presents a flowchart of the processing operation performed by the host computer.
Figure 18:
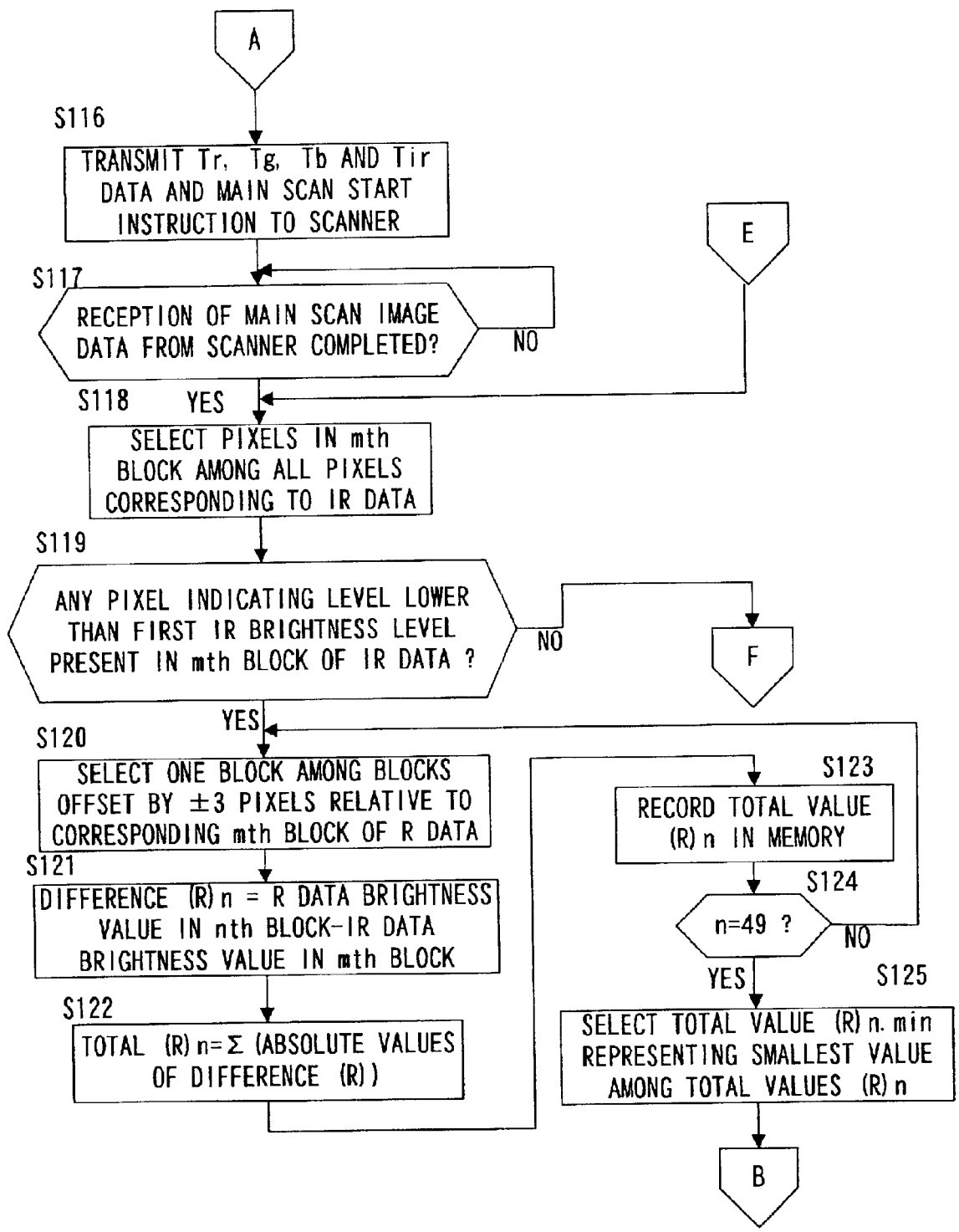
FIG. 18 presents the flowchart of the processing operation performed by the host computer.
Figure 19:
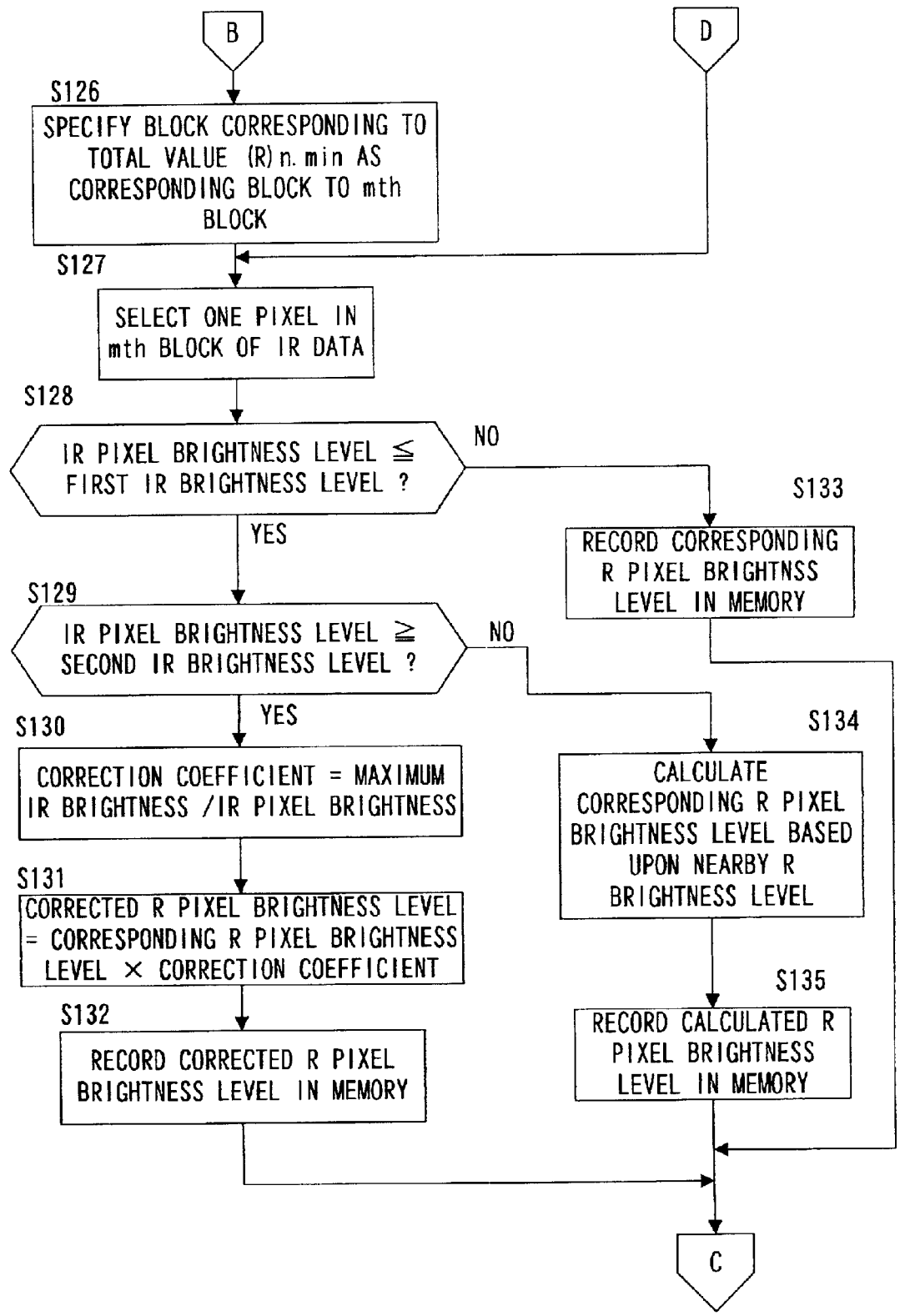
FIG. 19 presents the flowchart of the processing operation performed by the host computer.
Figure 20:
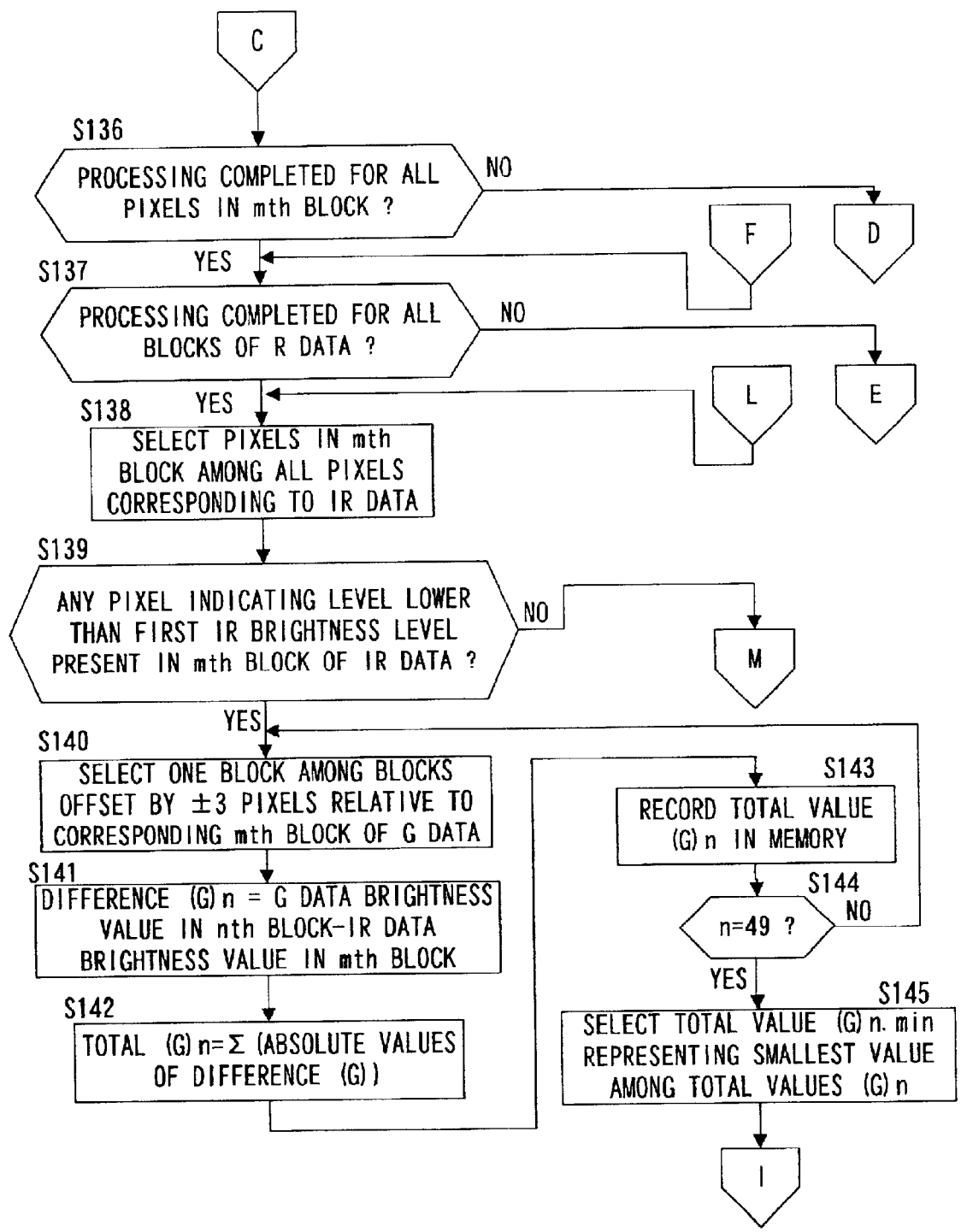
FIG. 20 presents the flowchart of the processing operation performed by the host computer.
Figure 21:
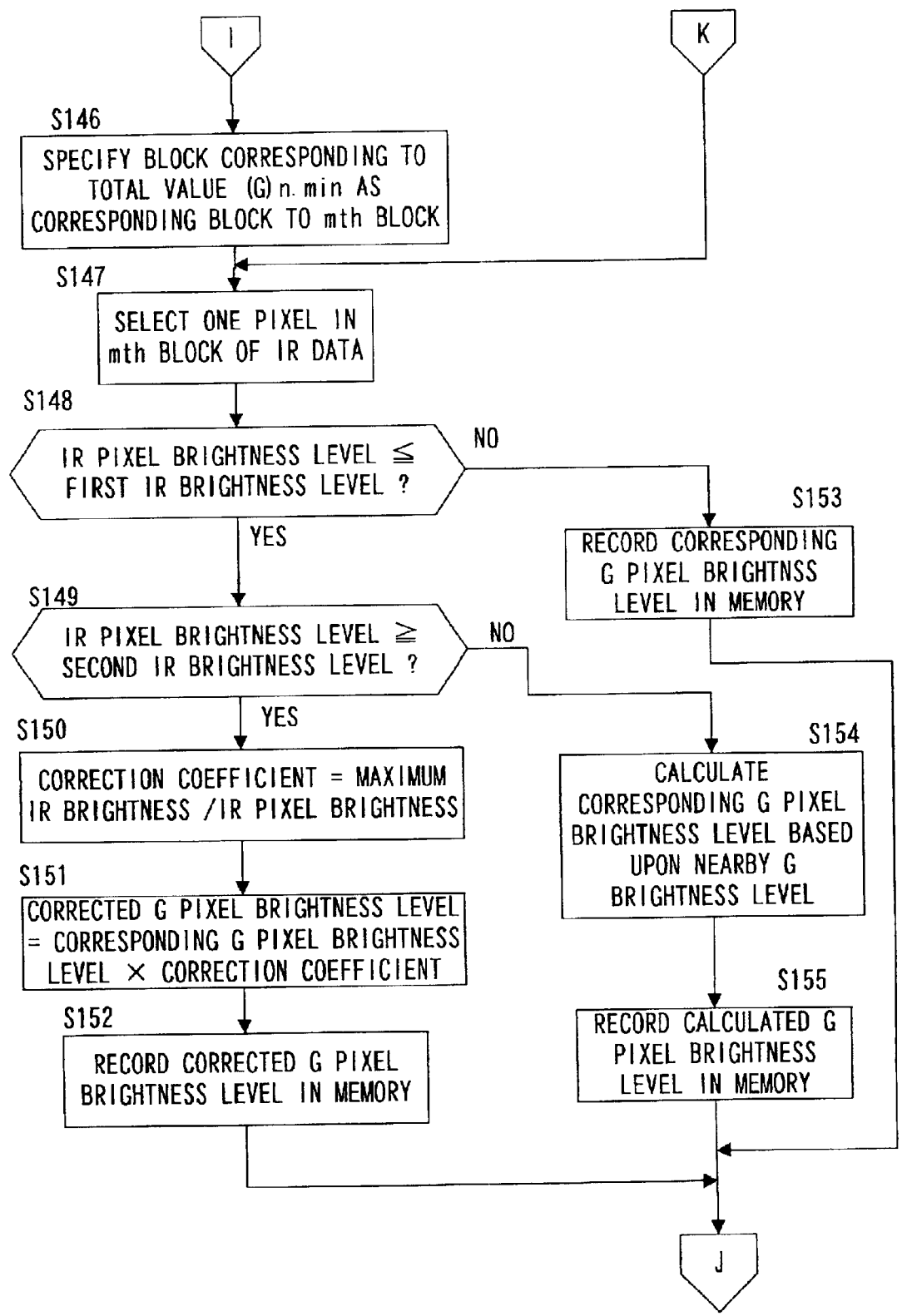
FIG. 21 presents the flowchart of the processing operation performed by the host computer.
Figure 22:
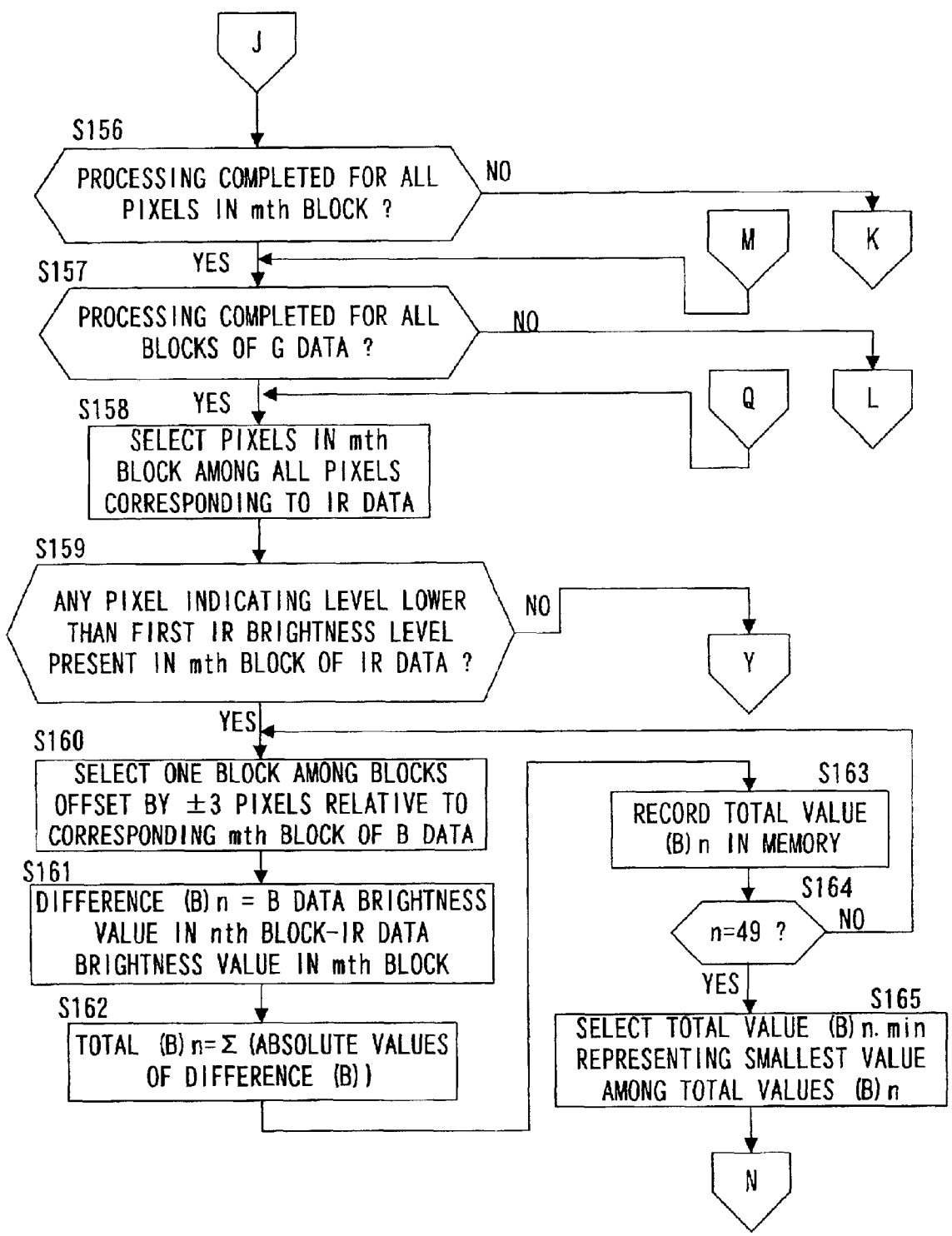
FIG. 22 presents the flowchart of the processing operation performed by the host computer.
Figure 23:
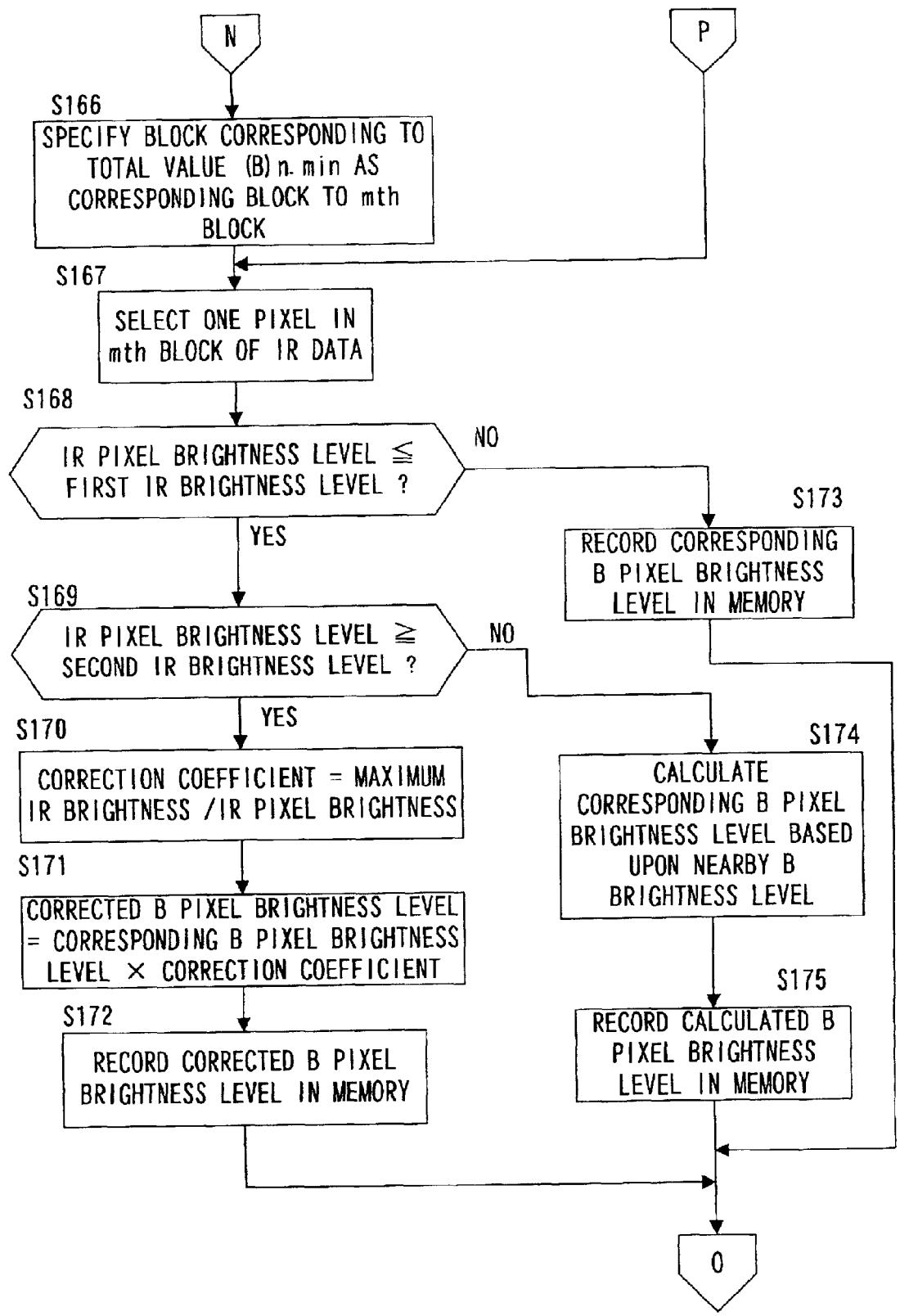
FIG. 23 presents the flowchart of the processing operation performed by the host computer.
Figure 24:
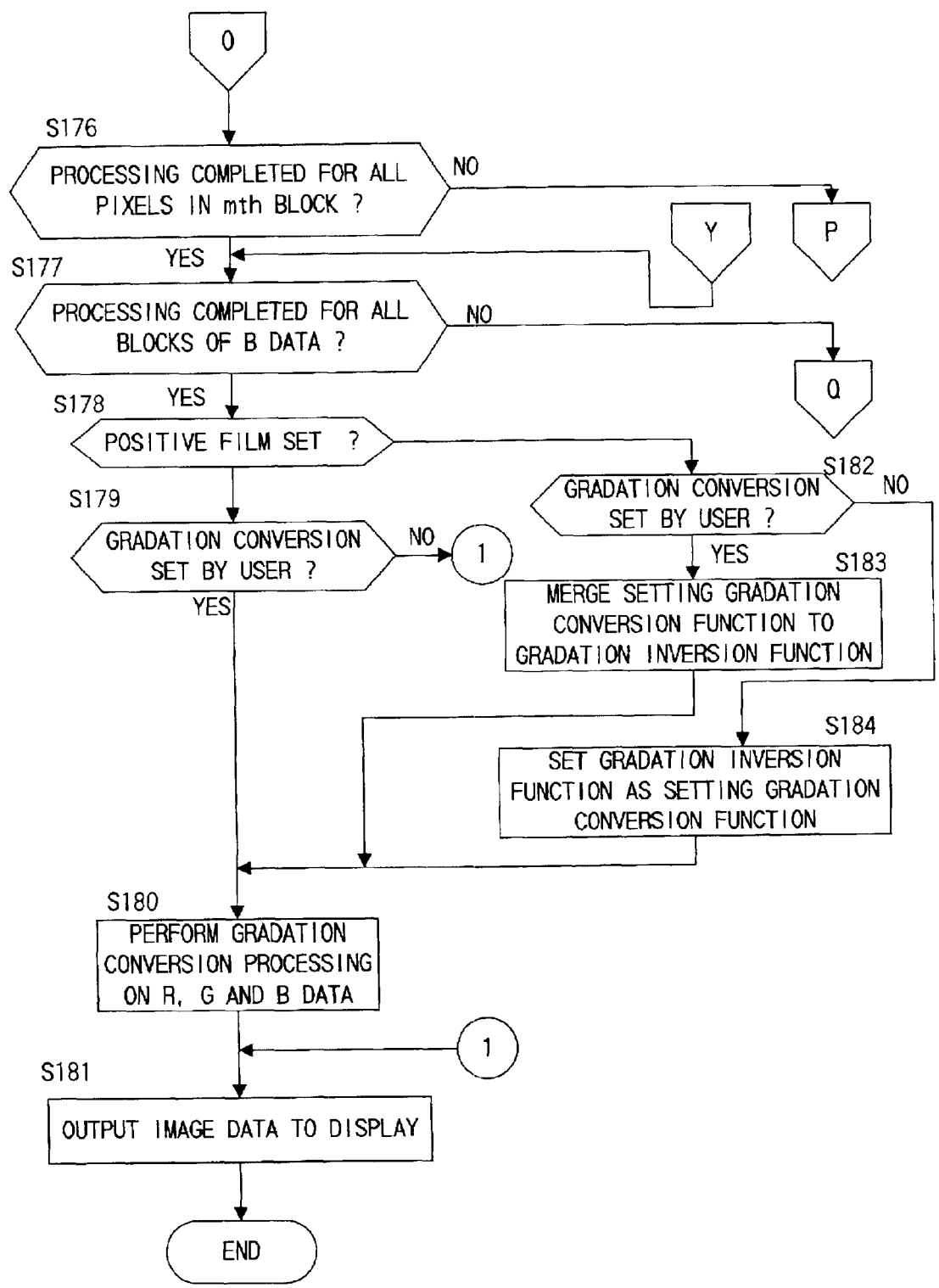
FIG. 24 presents the flowchart of the processing operation performed by the host computer.

The pre-scan is performed in a manner similar to that with which the main scan is implemented, in order to obtain Rmax, Gmax and Bmax necessary for the processing in steps S105–S109 and steps S110–S115 in FIG. 17. In other words, it is necessary to perform a pre-scan in units of individual lines over the entire surface of the original as in the main scan, to ascertain Rmax, Gmax and Bmax.

While an explanation is given above on an example in which the image reading device adopts the linear sequential read method, the present invention is not limited to this example and it may be applied in an image reading device adopting the planar sequential read method.

In the embodiment shown in FIGS. 17–24, the visible light image formation position can be determined based upon the infrared image signal and also defects in the image attributable to dirt, dust, scratches, fingerprints or the like can be corrected, so that an image achieving a high image quality is read.

What is claimed is:
1. An image reading device comprising:
an infrared component separator that separates color components of an image light flux passing through a transmissive original into an infrared component;
an infrared image-capturing device that outputs an infrared image signal by capturing the infrared component of the image light flux that has been separated by said infrared component separator;
a visible component separator that separates the color components of the image light flux passing through the transmissive original into a visible component;
a visible image-capturing device that outputs a visible image signal by capturing the visible component of the image light flux that has been separated by said visible component separator;
an image forming optical system that forms the image of the light flux passing through the transmissive original at said infrared image-capturing device or at said visible image-capturing device;

a focal adjustment device that adjusts a position of said image forming optical system relative to the transmissive original;

means for image forming position decision-making that determines the position of said image forming optical system relative to the transmissive original as a visible image forming position at which the visible light component of the image light flux is formed at said visible image-capturing device, based upon said infrared image signal;, and a control device that implements control on said focal adjustment device based upon a decision made by said means for image forming position decision-making.

2. An image reading device according to claim 1, further comprising:

an infrared component detector that detects a level of the infrared component obtained through separation by said infrared component separator; and a correction device that detects a defect signal attributable to dirt, dust, a scratch or the like on the transmissive original based upon the infrared component level detected by said infrared component detector and corrects the visible image signal by using said defect signal thus detected.

3. An image reading device according to claim 2, wherein:
said correction device comprises:
a defective infrared component detector that detects a defective infrared component level at a defective position in the transmissive original manifesting an infrared component level lower than a first infrared component level;

a correction coefficient calculator that obtains a correction coefficient by calculating (first infrared component level)/(defective infrared component level) based upon said first infrared component level and said defective infrared component level;

a visible component detector that detects a visible component level of said visible component obtained through separation by said visible component separator; and a multiplier that calculates a corrected visible component level by multiplying the visible component level at the defective position in the transmissive originial by said correction coefficient.

4. An image reading device according to claim 1, wherein:
said infrared image-capturing device receives the infrared component of light passing through the transmissive original at a plurality of pixels and outputs a plurality of image signals each indicating an intensity level of the component of light received at the associated pixel; and said means for image forming position decision-making receives a plurality of infrared image signals output by said infrared image-capturing device at a plurality of measuring positions corresponding to various distances set between the transmissive original and said image forming optical system to determine said visible image forming position in correspondence to the position of said image forming optical system relative to the transmissive original with the highest contrast value among contrast values of said plurality of infrared image signals.

5. An image reading device according to claim 1, wherein:
said means for image forming position decision-making selects either the visible image signal or said infrared image signal and determines said visible image forming position based upon the selected image signal.

6. An image reading device according to claim 5, wherein:
said means for image forming position decision-making determines said visible image forming position based upon said infrared image signal after a failure to determine said visible image forming position based upon the visible image signal occurs.

7. An image reading device according to claim 6, wherein:
said means for image forming position decision-making receives both the visible image signal and said infrared image signal in advance to determine said visible image forming position based upon said infrared image signal after a failure to determine said visible image forming position based upon the visible image signal.

8. An image reading device according to claim 6, wherein:
said means for image forming position decision-making receives the infrared image signal output by said infrared image-capturing device after occurrence if a failure to determine said visible image forming position based upon the visible image signal, to determine said visible image forming position based upon said infrared image signal.

9. An image reading device according to claim 6, wherein:
said visible image-capturing device receives the visible component of light passing through the transmissive original at a plurality of pixels and outputs a plurality of visible image signals each indicating an intensity level of the component of light received at the associated pixel; and said means for image forming position decision-making receives said plurality of visible image signals output by said visible image-capturing device at a plurality of measuring positions corresponding to various distances set between the transmissive original and said image forming optical system, detects the largest contrast value representing a maximum value among contrast values of said plurality of visible image signals and determines that a failure to determine said visible image forming position has occurred if the largest contrast value is smaller than a threshold value.

10. An image reading device according to claim 6, wherein:
said visible image-capturing device receives the visible component of light passing through the transmissive original at a plurality of pixels and outputs a plurality of visible image signals each indicating an intensity level of the component of light received at the associated pixel; and said means for image forming position decision-making receives said plurality of visible image signals output by said visible image-capturing device at a plurality of measuring positions corresponding to various distances set between the transmissive original and said image forming optical system, detects the largest contrast value representing a maximum value among contrast values of said plurality of visible image signals, calculates a corrected largest contrast value by correcting the largest contrast value and decides that a failure to determine said visible image forming position has occurred if at least one of the contrast values obtained at measuring positions outside a specific range which includes the measuring position corresponding to the largest contrast value exceeds the corrected contrast value.

11. An image reading device according to claim 1, wherein:

said means for image forming position decision-making includes a storage device that stores a quantity of displacement manifesting between a position at which the infrared image is formed by said image forming optical system and a position at which the visible image is formed by said image forming optical system along the direction of the optical axis of said image forming optical system, to enable said means for image forming position decision-making to determine an infrared image forming position at which an image of the infrared component is formed at said infrared image-capturing device based upon said infrared image signal and to determine said visible image forming position based upon the quantity of displacement and the infrared image forming position.

12. A storage medium storing a control procedure to be implemented in an image reading device that comprises:

an infrared component separator that separates color components of an image light flux passing through a transmissive original into an infrared component;

an infrared image-capturing device that outputs an infrared image signal by capturing the infrared component of the image light flux that has been separated by said infrared component separator;

a visible component separator that separates the color components of the image light flux passing through the transmissive original into a visible component;

a visible image-capturing device that outputs a visible image signal by capturing the visible component of the image light flux that has been separated by said visible component separator;

an image forming optical system that forms the image of the light flux passing through the transmissive original at said infrared image-capturing device or at said visible image-capturing device; and a focal adjustment device that adjusts a position of said image forming optical system relative to the transmissive original;

said storage medium storing therein:

an image forming position decision-making procedure through which the position of said image forming optical system relative to the transmissive original is determined as a visible image forming position at which an image of the visible component of the image light flux is formed at said visible image-capturing device, based upon the infrared image signal; and a control procedure through which said focal adjustment device is controlled in conformance to the decision made through said image forming position decision-making procedure.

13. A storage medium according to claim 12, wherein:
said image forming position decision-making procedure includes a procedure through which either the visible image signal or the infrared image signal is selected and said visible image forming position is determined in correspondence to the selected image signal.

14. A storage medium according to claim 13, wherein:
said image forming position decision-making procedure includes a procedure through which said visible image forming position is determined based upon the infrared image signal after a failure to determine the visible image forming position based upon the visible image signal occurs.

15. A storage medium according to claim 14, wherein:
said visible image-capturing device receives the visible component of light passing through the transmissive original at a plurality of pixels and outputs a plurality of visible image signals each indicating an intensity level of the component received at the associated pixel; and said image forming position decision-making procedure includes a procedure through which said plurality of visible image signals output by said visible image-capturing device at a plurality of measuring points corresponding to various distances set between the transmissive original and said image forming optical system are input, a procedure through which the largest contrast value representing a maximum value among the contrast values of said plurality of visible image signals is detected and a procedure through which a decision is made that a failure to determine a visible image forming position has occurred if the largest contrast value is smaller than a threshold value.

16. A storage medium according to claim 14, wherein:
said visible image-capturing device receives the visible component of light passing through the transmissive original at a plurality of pixels and outputs a plurality of visible image signals each indicating an intensity level of the component of light received at the associated pixel; and said image forming position decision-making procedure includes a procedure through which said plurality of visible image signals output by said visible image-capturing device at a plurality of measuring points corresponding to various distances set between the transmissive original and said image forming optical system are input, a procedure through which the largest contrast value representing a maximum value among the contrast values of said plurality of visible image signals is detected, a procedure through which corrected largest contrast value is calculated by correcting the largest contrast value and a procedure through which it is decided that a failure to determine said visible image forming position has occurred if at least one of the contrast values at measuring positions outside a specific range which includes the measuring position corresponding to the largest contrast value exceeds the corrected contrast value.

17. An image reading device comprising:
means for outputting visible light and infrared light to a transmissive original;

infrared image-capturing means for outputting an infrared image signal based upon a captured infrared component of an image light flux that has passed through the transmissive original;

visible image-capturing means for outputting a visible image signal based upon a captured visible light component of the image light flux that has passes through the transmissive original;

an image forming optical system that forms an image of the light flux passing through the transmissive original at said infrared image-capturing means or at said visible image-capturing means;

a focal adjustment device that adjusts a position of said image forming optical system relative to the transmissive original;

means for image forming position decision-making that determines the position of said image forming optical system relative to the transmissive original as a visible image forming position at which the visible light component of the image light flux is formed at said visible image-capturing means, based upon said infrared image signal; and a control device that implements control on said focal adjustment device based upon a decision made by said means for image forming position decision-making.

18. An image reading device according to claim 17, wherein:
the means for outputting visible light and infrared light selectively outputs one of the infrared light and the visible light; and
the infrared image-capturing means and the visible image-capturing means are a single image capturing device that selectively outputs one of the infrared image signal and the visible image signal depending on the light that is selectively output by the means for outputting visible light and infrared light.

19. An image reading device according to claim 17, wherein:
said infrared image-capturing means receives the infrared component of light passing through the transmissive original at a plurality of pixels and outputs a plurality of image signals each indicating an intensity level of the component of light received at the associated pixel; and
said means for image forming position decision-making receives a plurality of infrared image signals output by said infrared image-capturing means at a plurality of measuring positions corresponding to various distances set between the transmissive original and said image forming optical system to determine said visible image forming position in correspondence to the position of said image forming optical system relative to the transmissive original with the highest contrast value among contrast values of said plurality of infrared image signals.

20. An image reading device according to claim 17, wherein:
said means for image forming position decision-making selects either the visible image signal or said infrared image signal and determines said visable image forming position based upon the selected image signal.

21. An image reading device according to claim 20, wherein:
said means for image forming position decision-making determines said visible image forming position based upon said infrared image signal after a failure to determine said visible image forming position based upon the visible image signal occurs.

22. An image reading device according to claim 21, wherein:
said means for image forming position decision-making receives both the visible image signal and said infrared image signal in advance to determine said visible image forming position based upon said infrared image signal after a failure to determine said visible image forming position based upon the visible image signal.

23. An image reading device according to claim 21, wherein:
said means for image forming position decision-making receives the infrared image signal output by said infrared image-capturing means after occurrence of a failure to determine said visible image forming position based upon the visible image signal, to determine said visible image forming position based upon said infrared image signal.

24. An image reading device according to claim 21, wherein:
said visible image-capturing means receives the visible component of light passing through the transmissive original at a plurality of pixels and outputs plurality of visible image signals each indicating an intensity level of the component of light received at the associated pixel; and
said means for image forming position decision-making receives said plurality of visible image signals output by said visible image-capturing means at a plurality of measuring positions corresponding to various distances set between the transmissive original and said image forming optical system, detects the largest contrast value representing a maximum value among contrast values of said plurality of visible image signals and determines that a failure to determine said visible image forming position has occurred if the largest contrast value is smaller than a threshold value.

25. An image reading device according to claim 21, wherein:
said visible image-capturing means receives the visible component of light passing through the transmissive original at a plurality of pixels and outputs plurality of visible image signals each indicating an intensity level of the component of light received at the associated pixel; and
said means for image forming position decision-making receives said plurality of visible image signals output by said visible image-capturing means at a plurality of measuring positions corresponding to various distances set between the transmissive original and said image forming optical system, detects the largest contrast value representing a maximum value among contrast values of said plurality of visible image signals, calculates a corrected largest contrast value by correcting the largest contrast value and decides that a failure to determine said visible image forming position has occurred if at least one of the contrast values obtained at measuring positions outside a specific range which includes the measuring position corresponding to the largest contrast value exceeds the corrected contrast value.

26. An image reading device according to claim 17, wherein:
said means for image forming position decision-making includes a storage device that stores a quantity of displacement manifesting between a position at which the infrared image is formed by said image forming optical system and a position at which the visible image is formed by said image forming optical system along the direction of an optical axis of said image forming optical system, to enable said means for image forming position decision-making to determine an infrared image forming position at which an image of the infrared component is formed at said infrared image-capturing means based upon said infrared image signal and to determine said visible image forming position based upon the quantity of displacement and the infrared image forming position.

27. A storage medium storing a control procedure to be implemented in an image reading device that comprises:
means for outputting visible light and infrared light to a transmissive original;
infrared image-capturing means for outputting an infrared image signal based upon a captured infrared component of an image light flux that has passed through the transmissive original;
visible image-capturing means for outputting a visible image signal based upon a captured visible light component of the image light flux that has passed through the transmissive original;

an image forming optical system that forms an image of the light flux passing through the transmissive original at said infrared image-capturing means or at said visible image-capturing means; and a focal adjustment device that adjusts a position of said image forming optical system relative to the transmissive original;

said storage medium storing therein:

an image forming position decision-making procedure through which the position of said image forming optical system relative to the transmissive original is determined as a visible image forming position at which an image of the visible component of the image light flux is formed at said visible image-capturing means, based upon the infrared image signal; and a control procedure through which said focal adjustment device is controlled in conformance to the decision made through said image forming position decision-making procedure.

28. A storage medium according to claim 27, wherein:

said image forming position decision-making procedure includes a procedure through which either the visible image signal or the infrared image signal is selected and said visible image forming position is determined in correspondence to the selected image signal.

29. A storage medium according to claim 28, wherein:

said image forming position decision-making procedure includes a procedure through which said visible image forming position is determined based upon the infrared image signal after a failure to determine the visible image forming position based upon the visible image signal occurs.

30. A storage medium according to claim 29, wherein:

said visible image-capturing means receives the visible component of light passing through the transmissive original at a plurality of pixels and outputs a plurality of visible image signals each indicating an intensity level of the component received at the associated pixel; and said image forming position decision-making procedure includes a procedure through which said plurality of visible image signals output by said visible image-capturing means at a plurality of measuring points corresponding to various distances set between the transmissive original and said image forming optical system are input, a procedure through which the largest contrast value representing a maximum value among the contrast values of said plurality of visible image signals is detected, and a procedure through which a decision is made that a failure to determine a visible image forming position has occurred if the largest contrast value is smaller than a threshold value.

31. A storage medium according to claim 29, wherein:

said visible image-capturing means receives the visible component of light passing through the transmissive original at a plurality of pixels and outputs a plurality of visible image signals each indicating an intensity level of the component of light received at the associated pixel; and said image forming position decision-making procedure includes a procedure through which said plurality of visible image signals output by said visible image-capturing means at a plurality of measuring points corresponding to various distances set between the transmissive original and said image forming optical system are input, a procedure through which the largest contrast value representing a maximum value among the contrast values of said plurality of visible image signals is detected, a procedure through which corrected largest contrast value is calculated by correcting the largest contrast value, and a procedure through which it is decided that a failure to determine said visible image forming position has occurred if at least one of the contrast values at measuring positions outside a specific range which includes the measuring position corresponding to the largest contrast value exceeds the corrected contrast value.

* * * * *